United States Patent
Sood et al.

(10) Patent No.: US 11,388,210 B1
(45) Date of Patent: Jul. 12, 2022

(54) STREAMING ANALYTICS USING A SERVERLESS COMPUTE SYSTEM

(71) Applicant: Amazon Technologies, Inc., Seattle, WA (US)

(72) Inventors: Vinayak Sood, Seattle, WA (US); Jia Liu, Campbell, CA (US); Mandakini Saroop, Seattle, WA (US); Tejas Mahadeo Ghadge, Seattle, WA (US); Himanshu Sharma, Issaquah, WA (US); Nithin Vommi, Seattle, WA (US); Tyson Charles Olychuck, Seattle, WA (US); Dinesh Saheblal Gupta, Bellevue, WA (US); Peng Sun, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/305,139

(22) Filed: Jun. 30, 2021

(51) Int. Cl.
*H04L 29/06* (2006.01)
*H04L 65/61* (2022.01)
(Continued)

(52) U.S. Cl.
CPC ........ *H04L 65/4069* (2013.01); *H04L 65/608* (2013.01); *H04L 67/2833* (2013.01); *H04L 67/2838* (2013.01)

(58) Field of Classification Search
None
See application file for complete search history.

(56) References Cited

U.S. PATENT DOCUMENTS

| 4,949,254 A | 8/1990 | Shorter |
| 5,283,888 A | 2/1994 | Dao et al. |

(Continued)

FOREIGN PATENT DOCUMENTS

| CA | 2975522 A1 | 8/2016 |
| CN | 1341238 A | 3/2002 |

(Continued)

OTHER PUBLICATIONS

Anonymous: "Docker run reference", Dec. 7, 2015, XP055350246, Retrieved from the Internet: URL:https://web.archive.org/web/20151207111702/https:/docs.docker.com/engine/reference/run/ [retrieved on Feb. 28, 2017].

(Continued)

*Primary Examiner* — Dhairya A Patel
(74) *Attorney, Agent, or Firm* — Knobbe, Martens, Olson & Bear, LLP

(57) ABSTRACT

Systems and methods are described implementing streaming analytics on a serverless compute system. A user can specify a data stream against which analytics should be conducted, serverless functions to be used to conduct the analysis, and criteria for the analytics, such as windowing criteria and aggregation criteria. The windowing criteria can specify windows of items within the stream that should be collectively analyzed. The aggregation criteria can specify how to group items within each window during analysis. A poller device can read data items from the stream, window and group the items according to the windowing and aggregation criteria, and invoke serverless functions to conduct streaming analytics on the data items. The poller device can further maintain state between invocations.

20 Claims, 7 Drawing Sheets

(51) Int. Cl.
  *H04L 67/567* (2022.01)
  *H04L 67/566* (2022.01)
  *H04L 65/65* (2022.01)

(56) References Cited

U.S. PATENT DOCUMENTS

| | | |
|---|---|---|
| 5,835,764 A | 11/1998 | Platt et al. |
| 5,970,488 A | 10/1999 | Crowe et al. |
| 5,983,197 A | 11/1999 | Enta |
| 6,237,005 B1 | 5/2001 | Griffin |
| 6,260,058 B1 | 7/2001 | Hoenninger et al. |
| 6,385,636 B1 | 5/2002 | Suzuki |
| 6,463,509 B1 | 10/2002 | Teoman et al. |
| 6,501,736 B1 | 12/2002 | Smolik et al. |
| 6,523,035 B1 | 2/2003 | Fleming et al. |
| 6,549,936 B1 | 4/2003 | Hirabayashi |
| 6,708,276 B1 | 3/2004 | Yarsa et al. |
| 7,036,121 B1 | 4/2006 | Casabona et al. |
| 7,308,463 B2 | 12/2007 | Taulbee et al. |
| 7,340,522 B1 | 3/2008 | Basu et al. |
| 7,360,215 B2 | 4/2008 | Kraiss et al. |
| 7,558,719 B1 | 7/2009 | Donlin |
| 7,577,722 B1 | 8/2009 | Khandekar et al. |
| 7,590,806 B2 | 9/2009 | Harris et al. |
| 7,665,090 B1 | 2/2010 | Tormasov et al. |
| 7,707,579 B2 | 4/2010 | Rodriguez |
| 7,730,464 B2 | 6/2010 | Trowbridge |
| 7,774,191 B2 | 8/2010 | Berkowitz et al. |
| 7,823,186 B2 | 10/2010 | Pouliot |
| 7,831,464 B1 | 11/2010 | Nichols et al. |
| 7,870,153 B2 | 1/2011 | Croft et al. |
| 7,886,021 B2 | 2/2011 | Scheifler et al. |
| 7,949,677 B2 | 5/2011 | Croft et al. |
| 7,954,150 B2 | 5/2011 | Croft et al. |
| 8,010,679 B2 | 8/2011 | Low et al. |
| 8,010,990 B2 | 8/2011 | Ferguson et al. |
| 8,024,564 B2 | 9/2011 | Bassani et al. |
| 8,046,765 B2 | 10/2011 | Cherkasova et al. |
| 8,051,180 B2 | 11/2011 | Mazzaferri et al. |
| 8,051,266 B2 | 11/2011 | DeVal et al. |
| 8,065,676 B1 | 11/2011 | Sahai et al. |
| 8,065,682 B2 | 11/2011 | Baryshnikov et al. |
| 8,095,931 B1 | 1/2012 | Chen et al. |
| 8,127,284 B2 | 2/2012 | Meijer et al. |
| 8,146,073 B2 | 3/2012 | Sinha |
| 8,166,304 B2 | 4/2012 | Murase et al. |
| 8,171,473 B2 | 5/2012 | Lavin |
| 8,201,026 B1 | 6/2012 | Bornstein et al. |
| 8,209,695 B1 | 6/2012 | Pruyne et al. |
| 8,219,987 B1 | 7/2012 | Vlaovic et al. |
| 8,296,267 B2 | 10/2012 | Cahill et al. |
| 8,321,554 B2 | 11/2012 | Dickinson |
| 8,321,558 B1 | 11/2012 | Sirota et al. |
| 8,336,079 B2 | 12/2012 | Budko et al. |
| 8,352,608 B1 | 1/2013 | Keagy et al. |
| 8,387,075 B1 | 2/2013 | McCann et al. |
| 8,392,558 B1 | 3/2013 | Ahuja et al. |
| 8,402,514 B1 | 3/2013 | Thompson et al. |
| 8,417,723 B1 | 4/2013 | Lissack et al. |
| 8,429,282 B1 | 4/2013 | Ahuja |
| 8,448,165 B1 | 5/2013 | Conover |
| 8,479,195 B2 | 7/2013 | Adams et al. |
| 8,490,088 B2 | 7/2013 | Tang |
| 8,555,281 B1 | 10/2013 | Van Dijk et al. |
| 8,560,699 B1 | 10/2013 | Theimer et al. |
| 8,566,835 B2 | 10/2013 | Wang et al. |
| 8,601,323 B2 | 12/2013 | Tsantilis |
| 8,613,070 B1 | 12/2013 | Borzycki et al. |
| 8,615,589 B1 | 12/2013 | Adogla et al. |
| 8,631,130 B2 | 1/2014 | Jackson |
| 8,667,471 B2 | 3/2014 | Wintergerst et al. |
| 8,677,359 B1 | 3/2014 | Cavage et al. |
| 8,694,996 B2 | 4/2014 | Cawlfield et al. |
| 8,700,768 B2 | 4/2014 | Benari |
| 8,719,415 B1 | 5/2014 | Sirota et al. |
| 8,725,702 B1 | 5/2014 | Raman et al. |
| 8,756,322 B1 | 6/2014 | Lynch |
| 8,756,696 B1 | 6/2014 | Miller |
| 8,763,091 B1 | 6/2014 | Singh et al. |
| 8,769,519 B2 | 7/2014 | Leitman et al. |
| 8,793,676 B2 | 7/2014 | Quinn et al. |
| 8,799,236 B1 | 8/2014 | Azari et al. |
| 8,799,879 B2 | 8/2014 | Wright et al. |
| 8,806,468 B2 | 8/2014 | Meijer et al. |
| 8,806,644 B1 | 8/2014 | McCorkendale et al. |
| 8,819,679 B2 | 8/2014 | Agarwal et al. |
| 8,825,863 B2 | 9/2014 | Hansson et al. |
| 8,825,964 B1 | 9/2014 | Sopka et al. |
| 8,839,035 B1 | 9/2014 | Dimitrovich et al. |
| 8,850,432 B2 | 9/2014 | Mcgrath et al. |
| 8,869,300 B2 | 10/2014 | Singh et al. |
| 8,874,952 B2 | 10/2014 | Tameshige et al. |
| 8,904,008 B2 | 12/2014 | Calder et al. |
| 8,966,495 B2 | 2/2015 | Kulkarni |
| 8,972,980 B2 | 3/2015 | Banga et al. |
| 8,990,807 B2 | 3/2015 | Wu et al. |
| 8,997,093 B2 | 3/2015 | Dimitrov |
| 9,002,871 B2 | 4/2015 | Bulkowski et al. |
| 9,021,501 B2 | 4/2015 | Li et al. |
| 9,027,087 B2 | 5/2015 | Ishaya et al. |
| 9,038,068 B2 | 5/2015 | Engle et al. |
| 9,052,935 B1 | 6/2015 | Rajaa |
| 9,086,897 B2 | 7/2015 | Oh et al. |
| 9,086,924 B2 | 7/2015 | Barsness et al. |
| 9,092,837 B2 | 7/2015 | Bala et al. |
| 9,098,528 B2 | 8/2015 | Wang |
| 9,104,477 B2 | 8/2015 | Kodialam et al. |
| 9,110,732 B1 | 8/2015 | Forschmiedt et al. |
| 9,110,770 B1 | 8/2015 | Raju et al. |
| 9,111,037 B1 | 8/2015 | Nalis et al. |
| 9,112,813 B2 | 8/2015 | Jackson |
| 9,116,733 B2 | 8/2015 | Banga et al. |
| 9,141,410 B2 | 9/2015 | Leafe et al. |
| 9,146,764 B1 | 9/2015 | Wagner |
| 9,152,406 B2 | 10/2015 | De et al. |
| 9,164,754 B1 | 10/2015 | Pohlack |
| 9,183,019 B2 | 11/2015 | Kruglick |
| 9,195,520 B2 | 11/2015 | Turk |
| 9,208,007 B2 | 12/2015 | Harper et al. |
| 9,218,190 B2 | 12/2015 | Anand et al. |
| 9,223,561 B2 | 12/2015 | Orveillon et al. |
| 9,223,966 B1 | 12/2015 | Satish et al. |
| 9,250,893 B2 | 2/2016 | Blahaerath et al. |
| 9,268,586 B2 | 2/2016 | Voccio et al. |
| 9,298,633 B1 | 3/2016 | Zhao et al. |
| 9,317,689 B2 | 4/2016 | Aissi |
| 9,323,556 B2 | 4/2016 | Wagner |
| 9,361,145 B1 | 6/2016 | Wilson et al. |
| 9,405,582 B2 | 8/2016 | Fuller et al. |
| 9,411,645 B1 | 8/2016 | Duan et al. |
| 9,413,626 B2 | 8/2016 | Reque et al. |
| 9,417,918 B2 | 8/2016 | Chin et al. |
| 9,430,290 B1 | 8/2016 | Gupta et al. |
| 9,436,555 B2 | 9/2016 | Dornemann et al. |
| 9,461,996 B2 | 10/2016 | Hayton et al. |
| 9,471,775 B1 | 10/2016 | Wagner et al. |
| 9,471,776 B2 | 10/2016 | Gu et al. |
| 9,483,335 B1 | 11/2016 | Wagner et al. |
| 9,489,227 B2 | 11/2016 | Oh et al. |
| 9,497,136 B1 | 11/2016 | Ramarao et al. |
| 9,501,345 B1 | 11/2016 | Lietz et al. |
| 9,514,037 B1 | 12/2016 | Dow et al. |
| 9,537,788 B2 | 1/2017 | Reque et al. |
| 9,563,613 B1 | 2/2017 | Dinkel et al. |
| 9,575,798 B2 | 2/2017 | Terayama et al. |
| 9,588,790 B1 | 3/2017 | Wagner et al. |
| 9,594,590 B2 | 3/2017 | Hsu |
| 9,596,350 B1 | 3/2017 | Dymshyts et al. |
| 9,600,312 B2 | 3/2017 | Wagner et al. |
| 9,613,127 B1 | 4/2017 | Rus et al. |
| 9,626,204 B1 | 4/2017 | Banga et al. |
| 9,628,332 B2 | 4/2017 | Bruno, Jr. et al. |
| 9,635,132 B1 | 4/2017 | Lin et al. |
| 9,652,306 B1 | 5/2017 | Wagner et al. |

(56) References Cited

U.S. PATENT DOCUMENTS

| | | |
|---|---|---|
| 9,652,617 B1 | 5/2017 | Evans et al. |
| 9,654,508 B2 | 5/2017 | Barton et al. |
| 9,661,011 B1 | 5/2017 | Van Horenbeeck et al. |
| 9,678,773 B1 | 6/2017 | Wagner et al. |
| 9,678,778 B1 | 6/2017 | Youseff |
| 9,703,681 B2 | 7/2017 | Taylor et al. |
| 9,715,402 B2 | 7/2017 | Wagner et al. |
| 9,720,661 B2 | 8/2017 | Gschwind et al. |
| 9,720,662 B2 | 8/2017 | Gschwind et al. |
| 9,727,725 B2 | 8/2017 | Wagner et al. |
| 9,733,967 B2 | 8/2017 | Wagner et al. |
| 9,760,387 B2 | 9/2017 | Wagner et al. |
| 9,760,443 B2 | 9/2017 | Tarasuk-Levin et al. |
| 9,767,271 B2 | 9/2017 | Ghose |
| 9,785,476 B2 | 10/2017 | Wagner et al. |
| 9,787,779 B2 | 10/2017 | Frank et al. |
| 9,798,831 B2 | 10/2017 | Chattopadhyay et al. |
| 9,811,363 B1 | 11/2017 | Wagner |
| 9,811,434 B1 | 11/2017 | Wagner |
| 9,817,695 B2 | 11/2017 | Clark |
| 9,830,175 B1 | 11/2017 | Wagner |
| 9,830,193 B1 | 11/2017 | Wagner et al. |
| 9,830,449 B1 | 11/2017 | Wagner |
| 9,864,636 B1 | 1/2018 | Patel et al. |
| 9,898,393 B2 | 2/2018 | Moorthi et al. |
| 9,910,713 B2 | 3/2018 | Wisniewski et al. |
| 9,921,864 B2 | 3/2018 | Singaravelu et al. |
| 9,928,108 B1 | 3/2018 | Wagner et al. |
| 9,929,916 B1 | 3/2018 | Subramanian et al. |
| 9,930,103 B2 | 3/2018 | Thompson |
| 9,930,133 B2 | 3/2018 | Susarla et al. |
| 9,952,896 B2 | 4/2018 | Wagner et al. |
| 9,977,691 B2 | 5/2018 | Marriner et al. |
| 9,979,817 B2 | 5/2018 | Huang et al. |
| 9,983,982 B1 | 5/2018 | Kumar et al. |
| 10,002,026 B1 | 6/2018 | Wagner |
| 10,013,267 B1 | 7/2018 | Wagner et al. |
| 10,042,660 B2 | 8/2018 | Wagner et al. |
| 10,048,974 B1 | 8/2018 | Wagner et al. |
| 10,049,302 B1 * | 8/2018 | Liu ........................ G06N 20/10 |
| 10,061,613 B1 | 8/2018 | Brooker et al. |
| 10,067,801 B1 | 9/2018 | Wagner |
| 10,102,040 B2 | 10/2018 | Marriner et al. |
| 10,108,443 B2 | 10/2018 | Wagner et al. |
| 10,139,876 B2 | 11/2018 | Lu et al. |
| 10,140,137 B2 | 11/2018 | Wagner |
| 10,146,635 B1 | 12/2018 | Chai et al. |
| 10,162,655 B2 | 12/2018 | Tuch et al. |
| 10,162,672 B2 | 12/2018 | Wagner et al. |
| 10,162,688 B2 | 12/2018 | Wagner |
| 10,191,861 B1 | 1/2019 | Steinberg |
| 10,193,839 B2 | 1/2019 | Tandon et al. |
| 10,198,298 B2 | 2/2019 | Bishop et al. |
| 10,203,990 B2 | 2/2019 | Wagner et al. |
| 10,248,467 B2 | 4/2019 | Wisniewski et al. |
| 10,255,090 B2 | 4/2019 | Tuch et al. |
| 10,277,708 B2 | 4/2019 | Wagner et al. |
| 10,282,229 B2 | 5/2019 | Wagner et al. |
| 10,282,250 B1 * | 5/2019 | Banerjee ............... G06F 3/0685 |
| 10,303,492 B1 | 5/2019 | Wagner et al. |
| 10,331,462 B1 | 6/2019 | Varda et al. |
| 10,346,625 B2 | 7/2019 | Anderson et al. |
| 10,353,678 B1 | 7/2019 | Wagner |
| 10,353,746 B2 | 7/2019 | Reque et al. |
| 10,360,025 B2 | 7/2019 | Foskett et al. |
| 10,360,067 B1 | 7/2019 | Wagner |
| 10,365,985 B2 | 7/2019 | Wagner |
| 10,387,177 B2 | 8/2019 | Wagner et al. |
| 10,402,231 B2 | 9/2019 | Marriner et al. |
| 10,423,158 B1 | 9/2019 | Hadlich |
| 10,437,629 B2 | 10/2019 | Wagner et al. |
| 10,445,140 B1 | 10/2019 | Sagar et al. |
| 10,459,822 B1 | 10/2019 | Gondi |
| 10,503,626 B2 | 12/2019 | Idicula et al. |
| 10,528,390 B2 | 1/2020 | Brooker et al. |
| 10,531,226 B1 | 1/2020 | Wang et al. |
| 10,552,193 B2 | 2/2020 | Wagner et al. |
| 10,552,442 B1 | 2/2020 | Lusk et al. |
| 10,564,946 B1 | 2/2020 | Wagner et al. |
| 10,572,375 B1 | 2/2020 | Wagner |
| 10,592,269 B2 | 3/2020 | Wagner et al. |
| 10,608,973 B2 | 3/2020 | Kuo et al. |
| 10,615,984 B1 | 4/2020 | Wang |
| 10,623,476 B2 | 4/2020 | Thompson |
| 10,637,817 B2 | 4/2020 | Kuo et al. |
| 10,649,749 B1 | 5/2020 | Brooker et al. |
| 10,649,792 B1 | 5/2020 | Kulchytskyy et al. |
| 10,650,156 B2 | 5/2020 | Anderson et al. |
| 10,686,605 B2 | 6/2020 | Chhabra et al. |
| 10,691,498 B2 | 6/2020 | Wagner |
| 10,713,080 B1 | 7/2020 | Brooker et al. |
| 10,719,367 B1 | 7/2020 | Kim et al. |
| 10,725,752 B1 | 7/2020 | Wagner et al. |
| 10,725,826 B1 | 7/2020 | Sagar et al. |
| 10,733,085 B1 | 8/2020 | Wagner |
| 10,754,701 B1 | 8/2020 | Wagner |
| 10,776,091 B1 | 9/2020 | Wagner et al. |
| 10,776,171 B2 | 9/2020 | Wagner et al. |
| 10,817,331 B2 | 10/2020 | Mullen et al. |
| 10,824,484 B2 | 11/2020 | Wagner et al. |
| 10,831,898 B1 | 11/2020 | Wagner |
| 10,846,117 B1 | 11/2020 | Steinberg |
| 10,853,112 B2 | 12/2020 | Wagner et al. |
| 10,853,115 B2 | 12/2020 | Mullen et al. |
| 10,884,722 B2 | 1/2021 | Brooker et al. |
| 10,884,787 B1 | 1/2021 | Wagner et al. |
| 10,884,802 B2 | 1/2021 | Wagner et al. |
| 10,884,812 B2 | 1/2021 | Brooker et al. |
| 10,891,145 B2 | 1/2021 | Wagner et al. |
| 10,915,371 B2 | 2/2021 | Wagner et al. |
| 10,942,795 B1 | 3/2021 | Yanacek et al. |
| 10,949,237 B2 | 3/2021 | Piwonka et al. |
| 10,956,185 B2 | 3/2021 | Wagner |
| 11,010,188 B1 | 5/2021 | Brooker et al. |
| 11,016,815 B2 | 5/2021 | Wisniewski et al. |
| 11,099,870 B1 | 8/2021 | Brooker et al. |
| 11,099,917 B2 | 8/2021 | Hussels et al. |
| 11,115,404 B2 | 9/2021 | Siefker et al. |
| 11,119,809 B1 | 9/2021 | Brooker et al. |
| 11,119,813 B1 | 9/2021 | Kasaragod |
| 11,119,826 B2 | 9/2021 | Yanacek et al. |
| 11,126,469 B2 | 9/2021 | Reque et al. |
| 11,132,213 B1 | 9/2021 | Wagner |
| 11,146,569 B1 | 10/2021 | Brooker et al. |
| 11,159,528 B2 | 10/2021 | Siefker et al. |
| 11,188,391 B1 | 11/2021 | Sule |
| 11,190,609 B2 | 11/2021 | Siefker et al. |
| 11,243,953 B2 | 2/2022 | Wagner et al. |
| 2001/0044817 A1 | 11/2001 | Asano et al. |
| 2002/0120685 A1 | 8/2002 | Srivastava et al. |
| 2002/0172273 A1 | 11/2002 | Baker et al. |
| 2003/0071842 A1 | 4/2003 | King et al. |
| 2003/0084434 A1 | 5/2003 | Ren |
| 2003/0149801 A1 | 8/2003 | Kushnirskiy |
| 2003/0191795 A1 | 10/2003 | Bernardin et al. |
| 2003/0208569 A1 | 11/2003 | O'Brien et al. |
| 2003/0229794 A1 | 12/2003 | James, II et al. |
| 2004/0003087 A1 | 1/2004 | Chambliss et al. |
| 2004/0019886 A1 | 1/2004 | Berent et al. |
| 2004/0044721 A1 | 3/2004 | Song et al. |
| 2004/0049768 A1 | 3/2004 | Matsuyama et al. |
| 2004/0098154 A1 | 5/2004 | McCarthy |
| 2004/0158551 A1 | 8/2004 | Santosuosso |
| 2004/0205493 A1 | 10/2004 | Simpson et al. |
| 2004/0249947 A1 | 12/2004 | Novaes et al. |
| 2004/0268358 A1 | 12/2004 | Darling et al. |
| 2005/0027611 A1 | 2/2005 | Wharton |
| 2005/0044301 A1 | 2/2005 | Vasilevsky et al. |
| 2005/0120160 A1 | 6/2005 | Plouffe et al. |
| 2005/0132167 A1 | 6/2005 | Longobardi |
| 2005/0132368 A1 | 6/2005 | Sexton et al. |
| 2005/0149535 A1 | 7/2005 | Frey et al. |
| 2005/0193113 A1 | 9/2005 | Kokusho et al. |
| 2005/0193283 A1 | 9/2005 | Reinhardt et al. |

(56) References Cited

U.S. PATENT DOCUMENTS

| | | |
|---|---|---|
| 2005/0237948 A1 | 10/2005 | Wan et al. |
| 2005/0257051 A1 | 11/2005 | Richard |
| 2005/0262183 A1 | 11/2005 | Colrain et al. |
| 2005/0262512 A1 | 11/2005 | Schmidt et al. |
| 2006/0010440 A1 | 1/2006 | Anderson et al. |
| 2006/0015740 A1 | 1/2006 | Kramer |
| 2006/0036941 A1 | 2/2006 | Neil |
| 2006/0080678 A1 | 4/2006 | Bailey et al. |
| 2006/0123066 A1 | 6/2006 | Jacobs et al. |
| 2006/0129684 A1 | 6/2006 | Datta |
| 2006/0155800 A1 | 7/2006 | Matsumoto |
| 2006/0168174 A1 | 7/2006 | Gebhart et al. |
| 2006/0184669 A1 | 8/2006 | Vaidyanathan et al. |
| 2006/0200668 A1 | 9/2006 | Hybre et al. |
| 2006/0212332 A1 | 9/2006 | Jackson |
| 2006/0218601 A1 | 9/2006 | Michel |
| 2006/0242647 A1 | 10/2006 | Kimbrel et al. |
| 2006/0242709 A1 | 10/2006 | Seinfeld et al. |
| 2006/0248195 A1 | 11/2006 | Toumura et al. |
| 2006/0259763 A1 | 11/2006 | Cooperstein et al. |
| 2006/0288120 A1 | 12/2006 | Hoshino et al. |
| 2007/0033085 A1 | 2/2007 | Johnson |
| 2007/0050779 A1 | 3/2007 | Hayashi |
| 2007/0094396 A1 | 4/2007 | Takano et al. |
| 2007/0101325 A1 | 5/2007 | Bystricky et al. |
| 2007/0112864 A1 | 5/2007 | Ben-Natan |
| 2007/0130341 A1 | 6/2007 | Ma |
| 2007/0174419 A1 | 7/2007 | O'Connell et al. |
| 2007/0180449 A1 | 8/2007 | Croft et al. |
| 2007/0180450 A1 | 8/2007 | Croft et al. |
| 2007/0180493 A1 | 8/2007 | Croft et al. |
| 2007/0186212 A1 | 8/2007 | Mazzaferri et al. |
| 2007/0192082 A1 | 8/2007 | Gaos et al. |
| 2007/0192329 A1 | 8/2007 | Croft et al. |
| 2007/0198656 A1 | 8/2007 | Mazzaferri et al. |
| 2007/0199000 A1 | 8/2007 | Shekhel et al. |
| 2007/0220009 A1 | 9/2007 | Morris et al. |
| 2007/0226700 A1 | 9/2007 | Gal et al. |
| 2007/0240160 A1 | 10/2007 | Paterson-Jones |
| 2007/0255604 A1 | 11/2007 | Seelig |
| 2008/0028409 A1 | 1/2008 | Cherkasova et al. |
| 2008/0052401 A1 | 2/2008 | Bugenhagen et al. |
| 2008/0052725 A1 | 2/2008 | Stoodley et al. |
| 2008/0082977 A1 | 4/2008 | Araujo et al. |
| 2008/0104247 A1 | 5/2008 | Venkatakrishnan et al. |
| 2008/0104608 A1 | 5/2008 | Hyser et al. |
| 2008/0115143 A1 | 5/2008 | Shimizu et al. |
| 2008/0126110 A1 | 5/2008 | Haeberle et al. |
| 2008/0126486 A1 | 5/2008 | Heist |
| 2008/0127125 A1 | 5/2008 | Anckaert et al. |
| 2008/0147893 A1 | 6/2008 | Marripudi et al. |
| 2008/0189468 A1 | 8/2008 | Schmidt et al. |
| 2008/0195369 A1 | 8/2008 | Duyanovich et al. |
| 2008/0201568 A1 | 8/2008 | Quinn et al. |
| 2008/0201711 A1 | 8/2008 | Amir Husain |
| 2008/0209423 A1 | 8/2008 | Hirai |
| 2008/0244547 A1 | 10/2008 | Wintergerst et al. |
| 2008/0288940 A1 | 11/2008 | Adams et al. |
| 2008/0307098 A1 | 12/2008 | Kelly |
| 2009/0006897 A1 | 1/2009 | Sarsfield |
| 2009/0013153 A1 | 1/2009 | Hilton |
| 2009/0025009 A1 | 1/2009 | Brunswig et al. |
| 2009/0034537 A1 | 2/2009 | Colrain et al. |
| 2009/0055810 A1 | 2/2009 | Kondur |
| 2009/0055829 A1 | 2/2009 | Gibson |
| 2009/0070355 A1 | 3/2009 | Cadarette et al. |
| 2009/0077569 A1 | 3/2009 | Appleton et al. |
| 2009/0125902 A1 | 5/2009 | Ghosh et al. |
| 2009/0158275 A1 | 6/2009 | Wang et al. |
| 2009/0158407 A1 | 6/2009 | Nicodemus et al. |
| 2009/0177860 A1 | 7/2009 | Zhu et al. |
| 2009/0183162 A1 | 7/2009 | Kindel et al. |
| 2009/0193410 A1 | 7/2009 | Arthursson et al. |
| 2009/0198769 A1 | 8/2009 | Keller et al. |
| 2009/0204960 A1 | 8/2009 | Ben-yehuda et al. |
| 2009/0204964 A1 | 8/2009 | Foley et al. |
| 2009/0222922 A1 | 9/2009 | Sidiroglou et al. |
| 2009/0271472 A1 | 10/2009 | Scheifler et al. |
| 2009/0288084 A1 | 11/2009 | Astete et al. |
| 2009/0300151 A1 | 12/2009 | Friedman et al. |
| 2009/0300599 A1 | 12/2009 | Piotrowski |
| 2009/0307430 A1 | 12/2009 | Bruening et al. |
| 2010/0023940 A1 | 1/2010 | Iwamatsu et al. |
| 2010/0031274 A1 | 2/2010 | Sim-Tang |
| 2010/0031325 A1 | 2/2010 | Maigne et al. |
| 2010/0036925 A1 | 2/2010 | Haffner |
| 2010/0037031 A1 | 2/2010 | DeSantis et al. |
| 2010/0058342 A1 | 3/2010 | Machida |
| 2010/0058351 A1 | 3/2010 | Yahagi |
| 2010/0064299 A1 | 3/2010 | Kacin et al. |
| 2010/0070678 A1 | 3/2010 | Zhang et al. |
| 2010/0070725 A1 | 3/2010 | Prahlad et al. |
| 2010/0083048 A1 | 4/2010 | Calinoiu et al. |
| 2010/0083248 A1 | 4/2010 | Wood et al. |
| 2010/0094816 A1 | 4/2010 | Groves, Jr. et al. |
| 2010/0106926 A1 | 4/2010 | Kandasamy et al. |
| 2010/0114825 A1 | 5/2010 | Siddegowda |
| 2010/0115098 A1 | 5/2010 | De Baer et al. |
| 2010/0122343 A1 | 5/2010 | Ghosh |
| 2010/0131936 A1 | 5/2010 | Cheriton |
| 2010/0131959 A1 | 5/2010 | Spiers et al. |
| 2010/0186011 A1 | 7/2010 | Magenheimer |
| 2010/0198972 A1 | 8/2010 | Umbehocker |
| 2010/0199285 A1 | 8/2010 | Medovich |
| 2010/0257116 A1 | 10/2010 | Mehta et al. |
| 2010/0257269 A1 | 10/2010 | Clark |
| 2010/0269109 A1 | 10/2010 | Cartales |
| 2010/0299541 A1 | 11/2010 | Ishikawa et al. |
| 2010/0312871 A1 | 12/2010 | Desantis et al. |
| 2010/0325727 A1 | 12/2010 | Neystadt et al. |
| 2010/0329149 A1 | 12/2010 | Singh et al. |
| 2010/0329643 A1 | 12/2010 | Kuang |
| 2011/0004687 A1 | 1/2011 | Takemura |
| 2011/0010690 A1 | 1/2011 | Howard et al. |
| 2011/0010722 A1 | 1/2011 | Matsuyama |
| 2011/0023026 A1 | 1/2011 | Oza |
| 2011/0029970 A1 | 2/2011 | Arasaratnam |
| 2011/0029984 A1 | 2/2011 | Norman et al. |
| 2011/0040812 A1 | 2/2011 | Phillips |
| 2011/0055378 A1 | 3/2011 | Ferris et al. |
| 2011/0055396 A1 | 3/2011 | DeHaan |
| 2011/0055683 A1 | 3/2011 | Jiang |
| 2011/0078679 A1 | 3/2011 | Bozek et al. |
| 2011/0099204 A1 | 4/2011 | Thaler |
| 2011/0099551 A1 | 4/2011 | Fahrig et al. |
| 2011/0131572 A1 | 6/2011 | Elyashev et al. |
| 2011/0134761 A1 | 6/2011 | Smith |
| 2011/0141124 A1 | 6/2011 | Halls et al. |
| 2011/0153541 A1 | 6/2011 | Koch et al. |
| 2011/0153727 A1 | 6/2011 | Li |
| 2011/0153838 A1 | 6/2011 | Belkine et al. |
| 2011/0154353 A1 | 6/2011 | Theroux et al. |
| 2011/0173637 A1 | 7/2011 | Brandwine et al. |
| 2011/0179162 A1 | 7/2011 | Mayo et al. |
| 2011/0184993 A1 | 7/2011 | Chawla et al. |
| 2011/0225277 A1 | 9/2011 | Freimuth et al. |
| 2011/0231680 A1 | 9/2011 | Padmanabhan et al. |
| 2011/0247005 A1 | 10/2011 | Benedetti et al. |
| 2011/0258603 A1 | 10/2011 | Wisnovsky et al. |
| 2011/0265067 A1 | 10/2011 | Schulte et al. |
| 2011/0265069 A1 | 10/2011 | Fee et al. |
| 2011/0265164 A1 | 10/2011 | Lucovsky |
| 2011/0271276 A1 | 11/2011 | Ashok et al. |
| 2011/0276945 A1 | 11/2011 | Chasman et al. |
| 2011/0276963 A1 | 11/2011 | Wu et al. |
| 2011/0296412 A1 | 12/2011 | Banga et al. |
| 2011/0314465 A1 | 12/2011 | Smith et al. |
| 2011/0321033 A1 | 12/2011 | Kelkar et al. |
| 2011/0321051 A1 | 12/2011 | Rastogi |
| 2012/0011496 A1 | 1/2012 | Shimamura |
| 2012/0011511 A1 | 1/2012 | Horvitz et al. |
| 2012/0016721 A1 | 1/2012 | Weinman |
| 2012/0041970 A1 | 2/2012 | Ghosh et al. |
| 2012/0054744 A1 | 3/2012 | Singh et al. |

(56) References Cited

U.S. PATENT DOCUMENTS

| | | |
|---|---|---|
| 2012/0060207 A1 | 3/2012 | Mardikar et al. |
| 2012/0072762 A1 | 3/2012 | Atchison et al. |
| 2012/0072914 A1 | 3/2012 | Ota |
| 2012/0072920 A1 | 3/2012 | Kawamura |
| 2012/0079004 A1 | 3/2012 | Herman |
| 2012/0096271 A1 | 4/2012 | Ramarathinam et al. |
| 2012/0096468 A1 | 4/2012 | Chakravorty et al. |
| 2012/0101952 A1* | 4/2012 | Raleigh ............... G06Q 30/016 705/304 |
| 2012/0102307 A1 | 4/2012 | Wong |
| 2012/0102333 A1 | 4/2012 | Wong |
| 2012/0102481 A1 | 4/2012 | Mani et al. |
| 2012/0102493 A1 | 4/2012 | Allen et al. |
| 2012/0110155 A1 | 5/2012 | Adlung et al. |
| 2012/0110164 A1 | 5/2012 | Frey et al. |
| 2012/0110570 A1 | 5/2012 | Jacobson et al. |
| 2012/0110588 A1 | 5/2012 | Bieswanger et al. |
| 2012/0131379 A1 | 5/2012 | Tameshige et al. |
| 2012/0144290 A1 | 6/2012 | Goldman et al. |
| 2012/0166624 A1 | 6/2012 | Suit et al. |
| 2012/0173709 A1 | 7/2012 | Li et al. |
| 2012/0192184 A1 | 7/2012 | Burckart et al. |
| 2012/0197795 A1 | 8/2012 | Campbell et al. |
| 2012/0197958 A1 | 8/2012 | Nightingale et al. |
| 2012/0198442 A1 | 8/2012 | Kashyap et al. |
| 2012/0198514 A1 | 8/2012 | McCune et al. |
| 2012/0204164 A1 | 8/2012 | Castanos et al. |
| 2012/0209947 A1 | 8/2012 | Glaser et al. |
| 2012/0222038 A1 | 8/2012 | Katragadda et al. |
| 2012/0233464 A1 | 9/2012 | Miller et al. |
| 2012/0254193 A1 | 10/2012 | Chattopadhyay et al. |
| 2012/0324236 A1 | 12/2012 | Srivastava et al. |
| 2012/0331113 A1 | 12/2012 | Jain et al. |
| 2013/0014101 A1 | 1/2013 | Ballani et al. |
| 2013/0042234 A1 | 2/2013 | DeLuca et al. |
| 2013/0054804 A1 | 2/2013 | Jana et al. |
| 2013/0054927 A1 | 2/2013 | Raj et al. |
| 2013/0055262 A1 | 2/2013 | Lubsey et al. |
| 2013/0061208 A1 | 3/2013 | Tsao et al. |
| 2013/0061212 A1 | 3/2013 | Krause et al. |
| 2013/0061220 A1 | 3/2013 | Gnanasambandam et al. |
| 2013/0067484 A1 | 3/2013 | Sonoda et al. |
| 2013/0067494 A1 | 3/2013 | Srour et al. |
| 2013/0080641 A1 | 3/2013 | Lui et al. |
| 2013/0091387 A1 | 4/2013 | Bohnet et al. |
| 2013/0097601 A1 | 4/2013 | Podvratnik et al. |
| 2013/0111032 A1 | 5/2013 | Alapati et al. |
| 2013/0111469 A1 | 5/2013 | B et al. |
| 2013/0124807 A1 | 5/2013 | Nielsen et al. |
| 2013/0132942 A1 | 5/2013 | Wang |
| 2013/0132953 A1 | 5/2013 | Chuang et al. |
| 2013/0139152 A1 | 5/2013 | Chang et al. |
| 2013/0139166 A1 | 5/2013 | Zhang et al. |
| 2013/0145354 A1 | 6/2013 | Bruening et al. |
| 2013/0151587 A1 | 6/2013 | Takeshima et al. |
| 2013/0151648 A1 | 6/2013 | Luna |
| 2013/0151684 A1 | 6/2013 | Forsman et al. |
| 2013/0152047 A1 | 6/2013 | Moorthi et al. |
| 2013/0167147 A1 | 6/2013 | Corrie et al. |
| 2013/0179574 A1 | 7/2013 | Calder et al. |
| 2013/0179881 A1 | 7/2013 | Calder et al. |
| 2013/0179894 A1 | 7/2013 | Calder et al. |
| 2013/0179895 A1 | 7/2013 | Calder et al. |
| 2013/0185719 A1 | 7/2013 | Kar et al. |
| 2013/0185729 A1 | 7/2013 | Vasic et al. |
| 2013/0191924 A1 | 7/2013 | Tedesco |
| 2013/0198319 A1 | 8/2013 | Shen et al. |
| 2013/0198743 A1 | 8/2013 | Kruglick |
| 2013/0198748 A1 | 8/2013 | Sharp et al. |
| 2013/0198763 A1 | 8/2013 | Kunze et al. |
| 2013/0205092 A1 | 8/2013 | Roy et al. |
| 2013/0219390 A1 | 8/2013 | Lee et al. |
| 2013/0227097 A1 | 8/2013 | Yasuda et al. |
| 2013/0227534 A1 | 8/2013 | Ike et al. |
| 2013/0227563 A1 | 8/2013 | McGrath |
| 2013/0227641 A1 | 8/2013 | White et al. |
| 2013/0227710 A1 | 8/2013 | Barak et al. |
| 2013/0232190 A1 | 9/2013 | Miller et al. |
| 2013/0232480 A1 | 9/2013 | Winterfeldt et al. |
| 2013/0239125 A1 | 9/2013 | Iorio |
| 2013/0246944 A1 | 9/2013 | Pandiyan et al. |
| 2013/0262556 A1 | 10/2013 | Xu et al. |
| 2013/0263117 A1 | 10/2013 | Konik et al. |
| 2013/0274006 A1 | 10/2013 | Hudlow et al. |
| 2013/0275376 A1 | 10/2013 | Hudlow et al. |
| 2013/0275958 A1 | 10/2013 | Ivanov et al. |
| 2013/0275969 A1 | 10/2013 | Dimitrov |
| 2013/0275975 A1 | 10/2013 | Masuda et al. |
| 2013/0283141 A1 | 10/2013 | Stevenson et al. |
| 2013/0283176 A1 | 10/2013 | Hoole et al. |
| 2013/0290538 A1 | 10/2013 | Gmach et al. |
| 2013/0291087 A1 | 10/2013 | Kailash et al. |
| 2013/0297964 A1 | 11/2013 | Hegdal et al. |
| 2013/0298183 A1 | 11/2013 | McGrath et al. |
| 2013/0311650 A1 | 11/2013 | Brandwine et al. |
| 2013/0326506 A1 | 12/2013 | McGrath et al. |
| 2013/0326507 A1 | 12/2013 | McGrath et al. |
| 2013/0339950 A1 | 12/2013 | Ramarathinam et al. |
| 2013/0346470 A1 | 12/2013 | Obstfeld et al. |
| 2013/0346946 A1 | 12/2013 | Pinnix |
| 2013/0346952 A1 | 12/2013 | Huang et al. |
| 2013/0346964 A1 | 12/2013 | Nobuoka et al. |
| 2013/0346987 A1 | 12/2013 | Raney et al. |
| 2013/0346994 A1 | 12/2013 | Chen et al. |
| 2013/0347095 A1 | 12/2013 | Barjatiya et al. |
| 2014/0007097 A1 | 1/2014 | Chin et al. |
| 2014/0019523 A1 | 1/2014 | Heymann et al. |
| 2014/0019735 A1 | 1/2014 | Menon et al. |
| 2014/0019965 A1 | 1/2014 | Neuse et al. |
| 2014/0019966 A1 | 1/2014 | Neuse et al. |
| 2014/0040343 A1 | 2/2014 | Nickolov et al. |
| 2014/0040857 A1 | 2/2014 | Trinchini et al. |
| 2014/0040880 A1 | 2/2014 | Brownlow et al. |
| 2014/0047437 A1 | 2/2014 | Wu et al. |
| 2014/0058871 A1 | 2/2014 | Marr et al. |
| 2014/0059209 A1 | 2/2014 | Alnoor |
| 2014/0059226 A1 | 2/2014 | Messerli et al. |
| 2014/0059552 A1 | 2/2014 | Cunningham et al. |
| 2014/0068568 A1 | 3/2014 | Wisnovsky |
| 2014/0068608 A1 | 3/2014 | Kulkarni |
| 2014/0068611 A1 | 3/2014 | McGrath et al. |
| 2014/0073300 A1 | 3/2014 | Leeder et al. |
| 2014/0081984 A1 | 3/2014 | Sitsky et al. |
| 2014/0082165 A1 | 3/2014 | Marr et al. |
| 2014/0082201 A1 | 3/2014 | Shankari et al. |
| 2014/0101643 A1 | 4/2014 | Inoue |
| 2014/0101649 A1 | 4/2014 | Kamble et al. |
| 2014/0108722 A1 | 4/2014 | Lipchuk et al. |
| 2014/0109087 A1 | 4/2014 | Jujare et al. |
| 2014/0109088 A1 | 4/2014 | Dournov et al. |
| 2014/0129667 A1 | 5/2014 | Ozawa |
| 2014/0130040 A1 | 5/2014 | Lemanski |
| 2014/0137110 A1 | 5/2014 | Engle et al. |
| 2014/0173614 A1 | 6/2014 | Konik et al. |
| 2014/0173616 A1 | 6/2014 | Bird et al. |
| 2014/0180862 A1 | 6/2014 | Certain et al. |
| 2014/0189677 A1 | 7/2014 | Curzi et al. |
| 2014/0189704 A1 | 7/2014 | Narvaez et al. |
| 2014/0201735 A1 | 7/2014 | Kannan et al. |
| 2014/0207912 A1 | 7/2014 | Thibeault |
| 2014/0214752 A1 | 7/2014 | Rash et al. |
| 2014/0215073 A1 | 7/2014 | Dow et al. |
| 2014/0229221 A1 | 8/2014 | Shih et al. |
| 2014/0229942 A1 | 8/2014 | Wiseman et al. |
| 2014/0245297 A1 | 8/2014 | Hackett |
| 2014/0279581 A1 | 9/2014 | Devereaux |
| 2014/0280325 A1 | 9/2014 | Krishnamurthy et al. |
| 2014/0282418 A1 | 9/2014 | Wood et al. |
| 2014/0282559 A1 | 9/2014 | Verduzco et al. |
| 2014/0282615 A1 | 9/2014 | Cavage et al. |
| 2014/0282629 A1 | 9/2014 | Gupta et al. |
| 2014/0283045 A1 | 9/2014 | Brandwine et al. |
| 2014/0289286 A1 | 9/2014 | Gusak |
| 2014/0298295 A1 | 10/2014 | Overbeck |

(56) References Cited

U.S. PATENT DOCUMENTS

| | | |
|---|---|---|
| 2014/0304246 A1 | 10/2014 | Helmich et al. |
| 2014/0304698 A1 | 10/2014 | Chigurapati et al. |
| 2014/0304815 A1 | 10/2014 | Maeda |
| 2014/0317617 A1 | 10/2014 | O'Donnell |
| 2014/0337953 A1 | 11/2014 | Banatwala et al. |
| 2014/0344457 A1 | 11/2014 | Bruno, Jr. et al. |
| 2014/0344736 A1 | 11/2014 | Ryman et al. |
| 2014/0359093 A1 | 12/2014 | Raju et al. |
| 2014/0365781 A1 | 12/2014 | Dmitrienko et al. |
| 2014/0372489 A1 | 12/2014 | Jaiswal et al. |
| 2014/0372533 A1 | 12/2014 | Fu et al. |
| 2014/0380085 A1 | 12/2014 | Rash et al. |
| 2015/0033241 A1 | 1/2015 | Jackson et al. |
| 2015/0039891 A1 | 2/2015 | Ignatchenko et al. |
| 2015/0040229 A1 | 2/2015 | Chan et al. |
| 2015/0046926 A1 | 2/2015 | Kenchammana-Hosekote et al. |
| 2015/0046971 A1 | 2/2015 | Huh et al. |
| 2015/0052258 A1 | 2/2015 | Johnson et al. |
| 2015/0058914 A1 | 2/2015 | Yadav |
| 2015/0067019 A1 | 3/2015 | Balko |
| 2015/0067830 A1 | 3/2015 | Johansson et al. |
| 2015/0074659 A1 | 3/2015 | Madsen et al. |
| 2015/0074661 A1 | 3/2015 | Kothari et al. |
| 2015/0074662 A1 | 3/2015 | Saladi et al. |
| 2015/0081885 A1 | 3/2015 | Thomas et al. |
| 2015/0095822 A1 | 4/2015 | Feis et al. |
| 2015/0106805 A1 | 4/2015 | Melander et al. |
| 2015/0120928 A1 | 4/2015 | Gummaraju et al. |
| 2015/0121391 A1 | 4/2015 | Wang |
| 2015/0134626 A1 | 5/2015 | Theimer et al. |
| 2015/0135287 A1 | 5/2015 | Medeiros et al. |
| 2015/0142747 A1 | 5/2015 | Zou |
| 2015/0142952 A1 | 5/2015 | Bragstad et al. |
| 2015/0143374 A1 | 5/2015 | Banga et al. |
| 2015/0143381 A1 | 5/2015 | Chin et al. |
| 2015/0146716 A1 | 5/2015 | Olivier et al. |
| 2015/0154046 A1 | 6/2015 | Farkas et al. |
| 2015/0161384 A1 | 6/2015 | Gu et al. |
| 2015/0163231 A1 | 6/2015 | Sobko et al. |
| 2015/0178019 A1 | 6/2015 | Hegdal et al. |
| 2015/0178110 A1 | 6/2015 | Li et al. |
| 2015/0186129 A1 | 7/2015 | Apte et al. |
| 2015/0188775 A1 | 7/2015 | Van Der Walt et al. |
| 2015/0199218 A1 | 7/2015 | Wilson et al. |
| 2015/0205596 A1 | 7/2015 | Hiltegen et al. |
| 2015/0227598 A1 | 8/2015 | Hahn et al. |
| 2015/0229645 A1 | 8/2015 | Keith et al. |
| 2015/0235144 A1 | 8/2015 | Gusev et al. |
| 2015/0242225 A1 | 8/2015 | Muller et al. |
| 2015/0254248 A1 | 9/2015 | Burns et al. |
| 2015/0256621 A1 | 9/2015 | Noda et al. |
| 2015/0261578 A1 | 9/2015 | Greden et al. |
| 2015/0264014 A1 | 9/2015 | Budhani et al. |
| 2015/0269494 A1 | 9/2015 | Kardes et al. |
| 2015/0271280 A1 | 9/2015 | Zhang et al. |
| 2015/0289220 A1 | 10/2015 | Kim et al. |
| 2015/0309923 A1 | 10/2015 | Iwata et al. |
| 2015/0319160 A1 | 11/2015 | Ferguson et al. |
| 2015/0324174 A1 | 11/2015 | Bromley et al. |
| 2015/0324182 A1 | 11/2015 | Barros et al. |
| 2015/0324229 A1 | 11/2015 | Valine |
| 2015/0332048 A1 | 11/2015 | Mooring et al. |
| 2015/0332195 A1 | 11/2015 | Jue |
| 2015/0334173 A1 | 11/2015 | Coulmeau et al. |
| 2015/0350701 A1 | 12/2015 | Lemus et al. |
| 2015/0356294 A1 | 12/2015 | Tan et al. |
| 2015/0363181 A1 | 12/2015 | Alberti et al. |
| 2015/0363304 A1 | 12/2015 | Nagamalla et al. |
| 2015/0370560 A1 | 12/2015 | Tan et al. |
| 2015/0370591 A1 | 12/2015 | Tuch et al. |
| 2015/0370592 A1 | 12/2015 | Tuch et al. |
| 2015/0371244 A1 | 12/2015 | Neuse et al. |
| 2015/0378762 A1 | 12/2015 | Saladi et al. |
| 2015/0378764 A1 | 12/2015 | Sivasubramanian et al. |
| 2015/0378765 A1 | 12/2015 | Singh et al. |
| 2015/0379167 A1 | 12/2015 | Griffith et al. |
| 2016/0011901 A1 | 1/2016 | Hurwitz et al. |
| 2016/0012099 A1 | 1/2016 | Tuatini et al. |
| 2016/0019081 A1 | 1/2016 | Chandrasekaran et al. |
| 2016/0019082 A1 | 1/2016 | Chandrasekaran et al. |
| 2016/0019536 A1 | 1/2016 | Ortiz et al. |
| 2016/0021112 A1 | 1/2016 | Katieb |
| 2016/0026486 A1 | 1/2016 | Abdallah |
| 2016/0048606 A1 | 2/2016 | Rubinstein et al. |
| 2016/0070714 A1 | 3/2016 | D'Sa et al. |
| 2016/0072727 A1 | 3/2016 | Leafe et al. |
| 2016/0077901 A1 | 3/2016 | Roth et al. |
| 2016/0092320 A1 | 3/2016 | Baca |
| 2016/0092493 A1 | 3/2016 | Ko et al. |
| 2016/0098285 A1 | 4/2016 | Davis et al. |
| 2016/0100036 A1 | 4/2016 | Lo et al. |
| 2016/0103739 A1 | 4/2016 | Huang et al. |
| 2016/0110188 A1 | 4/2016 | Verde et al. |
| 2016/0117163 A1 | 4/2016 | Fukui et al. |
| 2016/0117254 A1 | 4/2016 | Susarla et al. |
| 2016/0119289 A1 | 4/2016 | Jain et al. |
| 2016/0124665 A1 | 5/2016 | Jain et al. |
| 2016/0124978 A1 | 5/2016 | Nithrakashyap et al. |
| 2016/0140180 A1 | 5/2016 | Park et al. |
| 2016/0150053 A1 | 5/2016 | Janczuk et al. |
| 2016/0162478 A1* | 6/2016 | Blassin ............ G06Q 10/06311 706/12 |
| 2016/0188367 A1 | 6/2016 | Zeng |
| 2016/0191420 A1 | 6/2016 | Nagarajan et al. |
| 2016/0203219 A1 | 7/2016 | Hoch et al. |
| 2016/0212007 A1 | 7/2016 | Alatorre et al. |
| 2016/0226955 A1 | 8/2016 | Moorthi et al. |
| 2016/0282930 A1 | 9/2016 | Ramachandran et al. |
| 2016/0285906 A1 | 9/2016 | Fine et al. |
| 2016/0292016 A1 | 10/2016 | Bussard et al. |
| 2016/0294614 A1 | 10/2016 | Searle et al. |
| 2016/0306613 A1 | 10/2016 | Busi et al. |
| 2016/0315910 A1 | 10/2016 | Kaufman |
| 2016/0350099 A1 | 12/2016 | Suparna et al. |
| 2016/0357536 A1 | 12/2016 | Firlik et al. |
| 2016/0364265 A1 | 12/2016 | Cao et al. |
| 2016/0364316 A1 | 12/2016 | Bhat et al. |
| 2016/0371127 A1 | 12/2016 | Antony et al. |
| 2016/0371156 A1 | 12/2016 | Merriman |
| 2016/0378449 A1 | 12/2016 | Khazanchi et al. |
| 2016/0378547 A1 | 12/2016 | Brouwer et al. |
| 2016/0378554 A1 | 12/2016 | Gummaraju et al. |
| 2017/0004169 A1 | 1/2017 | Merrill et al. |
| 2017/0041144 A1 | 2/2017 | Krapf et al. |
| 2017/0041309 A1 | 2/2017 | Ekambaram et al. |
| 2017/0060615 A1 | 3/2017 | Thakkar et al. |
| 2017/0060621 A1 | 3/2017 | Whipple et al. |
| 2017/0068574 A1 | 3/2017 | Cherkasova et al. |
| 2017/0075749 A1 | 3/2017 | Ambichl et al. |
| 2017/0083381 A1 | 3/2017 | Cong et al. |
| 2017/0085447 A1 | 3/2017 | Chen et al. |
| 2017/0085502 A1 | 3/2017 | Biruduraju |
| 2017/0085591 A1 | 3/2017 | Ganda et al. |
| 2017/0093684 A1 | 3/2017 | Jayaraman et al. |
| 2017/0093920 A1 | 3/2017 | Ducatel et al. |
| 2017/0134519 A1 | 5/2017 | Chen et al. |
| 2017/0147656 A1 | 5/2017 | Choudhary et al. |
| 2017/0149740 A1 | 5/2017 | Mansour et al. |
| 2017/0161059 A1 | 6/2017 | Wood et al. |
| 2017/0177854 A1 | 6/2017 | Gligor et al. |
| 2017/0188213 A1 | 6/2017 | Nirantar et al. |
| 2017/0221000 A1 | 8/2017 | Anand |
| 2017/0230262 A1 | 8/2017 | Sreeramoju et al. |
| 2017/0230499 A1 | 8/2017 | Mumick et al. |
| 2017/0249130 A1 | 8/2017 | Smiljamic et al. |
| 2017/0264681 A1 | 9/2017 | Apte et al. |
| 2017/0272462 A1 | 9/2017 | Kraemer et al. |
| 2017/0286187 A1 | 10/2017 | Chen et al. |
| 2017/0308520 A1 | 10/2017 | Beahan, Jr. et al. |
| 2017/0315163 A1 | 11/2017 | Wang et al. |
| 2017/0329578 A1 | 11/2017 | Iscen |
| 2017/0346808 A1 | 11/2017 | Anzai et al. |
| 2017/0353851 A1 | 12/2017 | Gonzalez et al. |
| 2017/0364345 A1 | 12/2017 | Fontoura et al. |

(56) References Cited

U.S. PATENT DOCUMENTS

| | | |
|---|---|---|
| 2017/0371720 A1 | 12/2017 | Basu et al. |
| 2017/0372142 A1 | 12/2017 | Bilobrov |
| 2018/0004555 A1 | 1/2018 | Ramanathan et al. |
| 2018/0004556 A1 | 1/2018 | Marriner et al. |
| 2018/0004575 A1 | 1/2018 | Marriner et al. |
| 2018/0046453 A1 | 2/2018 | Nair et al. |
| 2018/0046482 A1 | 2/2018 | Karve et al. |
| 2018/0060132 A1 | 3/2018 | Maru et al. |
| 2018/0060221 A1 | 3/2018 | Yim et al. |
| 2018/0060318 A1 | 3/2018 | Yang et al. |
| 2018/0067841 A1 | 3/2018 | Mahimkar |
| 2018/0067873 A1 | 3/2018 | Pikhur et al. |
| 2018/0069702 A1 | 3/2018 | Ayyadevara et al. |
| 2018/0081717 A1 | 3/2018 | Li |
| 2018/0089232 A1 | 3/2018 | Spektor et al. |
| 2018/0095738 A1 | 4/2018 | Dürkop et al. |
| 2018/0121665 A1 | 5/2018 | Anderson et al. |
| 2018/0129684 A1 | 5/2018 | Wilson et al. |
| 2018/0150339 A1 | 5/2018 | Pan et al. |
| 2018/0152401 A1 | 5/2018 | Tandon et al. |
| 2018/0152405 A1 | 5/2018 | Kuo et al. |
| 2018/0152406 A1 | 5/2018 | Kuo et al. |
| 2018/0192101 A1 | 7/2018 | Bilobrov |
| 2018/0225096 A1 | 8/2018 | Mishra et al. |
| 2018/0239636 A1 | 8/2018 | Arora et al. |
| 2018/0253333 A1 | 9/2018 | Gupta |
| 2018/0268130 A1 | 9/2018 | Ghosh et al. |
| 2018/0275987 A1 | 9/2018 | Vandeputte |
| 2018/0285101 A1 | 10/2018 | Yahav et al. |
| 2018/0300111 A1 | 10/2018 | Bhat et al. |
| 2018/0314845 A1 | 11/2018 | Anderson et al. |
| 2018/0316552 A1 | 11/2018 | Subramani Nadar et al. |
| 2018/0341504 A1 | 11/2018 | Kissell |
| 2018/0365422 A1 | 12/2018 | Callaghan et al. |
| 2018/0375781 A1 | 12/2018 | Chen et al. |
| 2019/0004866 A1 | 1/2019 | Du et al. |
| 2019/0028552 A1 | 1/2019 | Johnson, II et al. |
| 2019/0043231 A1 | 2/2019 | Uzgin et al. |
| 2019/0072529 A1 | 3/2019 | Andrawes et al. |
| 2019/0073430 A1 | 3/2019 | Webster |
| 2019/0079751 A1 | 3/2019 | Foskett et al. |
| 2019/0140831 A1 | 5/2019 | De Lima Junior et al. |
| 2019/0141015 A1 | 5/2019 | Nellen |
| 2019/0147085 A1 | 5/2019 | Pal et al. |
| 2019/0155629 A1 | 5/2019 | Wagner et al. |
| 2019/0171423 A1 | 6/2019 | Mishra et al. |
| 2019/0179678 A1 | 6/2019 | Banerjee et al. |
| 2019/0179725 A1 | 6/2019 | Mital et al. |
| 2019/0180036 A1 | 6/2019 | Shukla |
| 2019/0188288 A1 | 6/2019 | Holm et al. |
| 2019/0196795 A1* | 6/2019 | Cavalier ............ G06F 9/45512 |
| 2019/0196884 A1 | 6/2019 | Wagner |
| 2019/0235848 A1 | 8/2019 | Swiecki et al. |
| 2019/0238590 A1 | 8/2019 | Talukdar et al. |
| 2019/0250937 A1 | 8/2019 | Thomas et al. |
| 2019/0268152 A1 | 8/2019 | Sandoval et al. |
| 2019/0286475 A1 | 9/2019 | Mani |
| 2019/0286492 A1 | 9/2019 | Gulsvig Wood et al. |
| 2019/0303117 A1 | 10/2019 | Kocberber et al. |
| 2019/0311115 A1 | 10/2019 | Lavi et al. |
| 2019/0318312 A1 | 10/2019 | Foskett et al. |
| 2019/0361802 A1 | 11/2019 | Li et al. |
| 2019/0363885 A1 | 11/2019 | Schiavoni et al. |
| 2020/0007456 A1 | 1/2020 | Greenstein et al. |
| 2020/0026527 A1 | 1/2020 | Xu et al. |
| 2020/0028936 A1 | 1/2020 | Gupta et al. |
| 2020/0057680 A1 | 2/2020 | Marriner et al. |
| 2020/0065079 A1 | 2/2020 | Kocberber et al. |
| 2020/0073770 A1 | 3/2020 | Mortimore, Jr. et al. |
| 2020/0073987 A1 | 3/2020 | Perumala et al. |
| 2020/0081745 A1 | 3/2020 | Cybulski et al. |
| 2020/0110691 A1 | 4/2020 | Bryant et al. |
| 2020/0120120 A1 | 4/2020 | Cybulski |
| 2020/0136933 A1 | 4/2020 | Raskar |
| 2020/0153897 A1 | 5/2020 | Mestery et al. |
| 2020/0167208 A1 | 5/2020 | Floes et al. |
| 2020/0213151 A1 | 7/2020 | Srivatsan et al. |
| 2020/0327236 A1 | 10/2020 | Pratt et al. |
| 2020/0341799 A1 | 10/2020 | Wagner et al. |
| 2020/0366587 A1 | 11/2020 | White et al. |
| 2021/0081233 A1 | 3/2021 | Mullen et al. |
| 2021/0117534 A1 | 4/2021 | Maximov et al. |
| 2021/0232415 A1 | 7/2021 | Wagner et al. |
| 2021/0342125 A1* | 11/2021 | Burnett .................... G06F 8/34 |
| 2021/0342785 A1* | 11/2021 | Mann ................. G06Q 10/0633 |
| 2021/0389963 A1 | 12/2021 | Wagner |

FOREIGN PATENT DOCUMENTS

| | | |
|---|---|---|
| CN | 101002170 A | 7/2007 |
| CN | 101267334 A | 9/2008 |
| CN | 101345757 A | 1/2009 |
| CN | 101496005 A | 7/2009 |
| CN | 101627388 A | 1/2010 |
| CN | 101640700 A | 2/2010 |
| CN | 102420846 A | 4/2012 |
| CN | 103098027 A | 5/2013 |
| CN | 103384237 A | 11/2013 |
| CN | 103731427 A | 4/2014 |
| CN | 104243479 A | 12/2014 |
| CN | 105122243 A | 12/2015 |
| CN | 112513813 A | 3/2021 |
| EP | 2663052 A1 | 11/2013 |
| EP | 3201762 A1 | 8/2017 |
| EP | 3254434 A1 | 12/2017 |
| EP | 3356938 A1 | 8/2018 |
| EP | 3201768 | 12/2019 |
| EP | 3811209 A1 | 4/2021 |
| EP | 3814895 A1 | 5/2021 |
| EP | 3857375 A1 | 8/2021 |
| JP | 2002-287974 A | 10/2002 |
| JP | 2006-107599 A | 4/2006 |
| JP | 2007-080161 A | 3/2007 |
| JP | 2007-538323 A | 12/2007 |
| JP | 2010-026562 A | 2/2010 |
| JP | 2011-065243 A | 3/2011 |
| JP | 2011-233146 A | 11/2011 |
| JP | 2011-257847 A | 12/2011 |
| JP | 2013-156996 A | 8/2013 |
| JP | 2014-525624 A | 9/2014 |
| JP | 2017-534107 A | 11/2017 |
| JP | 2017-534967 A | 11/2017 |
| JP | 2018-503896 A | 2/2018 |
| JP | 2018-512087 A | 5/2018 |
| JP | 2018-536213 A | 12/2018 |
| KR | 10-357850 B1 | 10/2002 |
| WO | WO 2008/114454 A1 | 9/2008 |
| WO | WO 2009/137567 A1 | 11/2009 |
| WO | WO 2012/039834 A1 | 3/2012 |
| WO | WO 2012/050772 A1 | 4/2012 |
| WO | WO 2013/106257 A1 | 7/2013 |
| WO | WO 2015/078394 A1 | 6/2015 |
| WO | WO 2015/108539 A1 | 7/2015 |
| WO | WO 2015/149017 A1 | 10/2015 |
| WO | WO 2016/053950 A1 | 4/2016 |
| WO | WO 2016/053968 A1 | 4/2016 |
| WO | WO 2016/053973 A1 | 4/2016 |
| WO | WO 2016/090292 A1 | 6/2016 |
| WO | WO 2016/126731 A1 | 8/2016 |
| WO | WO 2016/164633 A1 | 10/2016 |
| WO | WO 2016/164638 A1 | 10/2016 |
| WO | WO 2017/059248 A1 | 4/2017 |
| WO | WO 2017/112526 A1 | 6/2017 |
| WO | WO 2017/172440 A1 | 10/2017 |
| WO | WO 2018/005829 A1 | 1/2018 |
| WO | WO 2018/098443 A1 | 5/2018 |
| WO | WO 2018/098445 A1 | 5/2018 |
| WO | WO 2020/005764 A1 | 1/2020 |
| WO | WO 2020/006081 A1 | 1/2020 |
| WO | WO 2020/069104 A1 | 4/2020 |
| WO | WO 2020/123439 A1 | 6/2020 |

(56) References Cited

FOREIGN PATENT DOCUMENTS

| WO | WO 2020/264431 A1 | 12/2020 |
| WO | WO 2021/108435 A1 | 6/2021 |

OTHER PUBLICATIONS

Adapter Pattern, Wikipedia, https://en.wikipedia.org/w/index.php?title=Adapter_pattern&oldid=654971255, [retrieved May 26, 2016], 6 pages.

Amazon, "AWS Lambda: Developer Guide", Jun. 26, 2016 Retrieved from the Internet, URL:http://docs.aws.amazon.com/lambda/latest/dg/lambda-dg.pdf, [retrieved on Aug. 30, 2017], 314 pages.

Amazon, "AWS Lambda: Developer Guide", Apr. 30, 2016 Retrieved from the Internet, URL: https://web.archive.org/web/20160430050158/http://docs.aws.amazon.com:80/lambda/latest/dg/lambda-dg.pdf, 346 pages.

Amazon, "AWS Lambda: Developer Guide", Retrieved from the Internet, 2019, URL : http://docs.aws.amazon.com/lambda/ latest/dg/lambda-dg.pdf, 521 pages.

Balazinska et al., Moirae: History-Enhanced Monitoring, Published: Jan. 2007, 12 pages.

Bebenita et al., "Trace-Based Compilation in Execution Environments without Interpreters," ACM, Copyright 2010, 10 pages.

Ben-Yehuda et al., "Deconstructing Amazon EC2 Spot Instance Pricing", ACM Transactions on Economics and Computation 1.3, Sep. 2013, 15 pages.

Bhadani et al., Performance evaluation of web servers using central load balancing policy over virtual machines on cloud, Jan. 2010, 4 pages.

Bryan Liston, "Ad Hoc Big Data Processing Made Simple with Serverless Map Reduce", Nov. 4, 2016, Amazon Web Services <https ://laws. amazon .com/bl ogs/compute/ad-hoc-big-data-processi ng-made-si mple-with-serverless-mapred uce >.

CodeChef ADMIN discussion web page, retrieved from https://discuss.codechef.com/t/what-are-the-memory-limit-and-stack-size-on-codechef/14159, retrieved on Sep. 10, 2019.

CodeChef IDE web page, Code, Compile & Run, retrieved from https://www.codechef.com/ide, retrieved on Sep. 9, 2019.

Czajkowski, G., and L. Daynes, Multitasking Without Compromise: A Virtual Machine Evolution 47(4a):60-73, ACM Sigplan Notices—Supplemental Issue, Apr. 2012.

Das et al., Adaptive Stream Processing using Dynamic Batch Sizing, Nov. 2014, 13 pages.

Deis, Container, Jun. 2014, 1 page.

Dean et al, "MapReduce: Simplified Data Processing on Large Clusters", ACM, 2008, pp. 107-113.

Dombrowski, M., et al., Dynamic Monitor Allocation in the Java Virtual Machine, JTRES '13, Oct. 9-11, 2013, pp. 30-37.

Dornemann et al., "On-Demand Resource Provisioning for BPEL Workflows Using Amazon's Elastic Compute Cloud", 9th IEEE/ACM International Symposium on Cluster Computing and the Grid, 2009, pp. 140-147.

Dynamic HTML, Wikipedia page from date Mar. 27, 2015, retrieved using the WayBackMachine, from https://web.archive.org/web/20150327215418/https://en.wikipedia.org/wiki/Dynamic_HTML, 2015, 6 pages.

Ekanayake et al, "Twister: A Runtime for Iterative MapReduce", ACM, 2010, pp. 810-818.

Espadas, J., et al., A Tenant-Based Resource Allocation Model for Scaling Software-as-a-Service Applications Over Cloud Computing Infrastructures, Future Generation Computer Systems, vol. 29, pp. 273-286, 2013.

Fan et al., Online Optimization of VM Deployment in IaaS Cloud, Dec. 17, 2012-Dec. 19, 2012, 6 pages.

Ha et al., A Concurrent Trace-based Just-In-Time Compiler for Single-threaded JavaScript, utexas.edu, Jun. 2009.

Hammoud et al, "Locality-Aware Reduce Task Scheduling for MapReduce", IEEE, 2011, pp. 570-576.

Han et al., Lightweight Resource Scaling for Cloud Applications, May 13, 2012-May 16, 2012, 8 pages.

Hoffman, Auto scaling your website with Amazon Web Services (AWS)—Part 2, Cardinalpath, Sep. 2015, 15 pages.

http://discuss.codechef.com discussion web page from date Nov. 11, 2012, retrieved using the WayBackMachine, from https://web.archive.org/web/20121111040051/http://discuss.codechef.com/questions/2881 /why-are-simple-java-programs-using-up-so-much-space, 2012.

htttps://www.codechef.com code error help page from Jan. 2014, retrieved from https://www.codechef.com/JAN14/status/ERROR,val23, 2014.

http://www.codechef.com/ide web page from date Apr. 5, 2015, retrieved using the WayBackMachine, from https://web.archive.org/web/20150405045518/http://www.codechef.com/ide, 2015.

Huang, Zhe, Danny HK Tsang, and James She. "A virtual machine consolidation framework for mapreduce enabled computing clouds." 2012 24th International Teletraffic Congress (ITC 24). IEEE, Sep. 4, 2012-Sep. 7, 2012.

Kamga et al., Extended scheduler for efficient frequency scaling in virtualized systems, Jul. 2012, 8 pages.

Kato, et al. "Web Service Conversion Architecture of the Web Application and Evaluation"; Research Report from Information Processing Society, Apr. 3, 2006 with Machine Translation.

Kazempour et al., AASH: an asymmetry-aware scheduler for hypervisors, Jul. 2010, 12 pages.

Kim et al., "MRBench: A Benchmark for Map-Reduce Framework", IEEE, 2008, pp. 11-18.

Kraft et al., 10 performance prediction in consolidated virtualized environments, Mar. 2011, 12 pages.

Krsul et al., "VMPlants: Providing and Managing Virtual Machine Execution Environments for Grid Computing", Supercomputing, 2004. Proceedings of the ACM/IEEESC 2004 Conference Pittsburgh, PA, XP010780332, Nov. 6-12, 2004, 12 pages.

Lagar-Cavilla et al., "SnowFlock: Virtual Machine Cloning as a First-Class Cloud Primitive", ACM Transactions on Computer Systems, vol. 29, No. 1, Article 2, Publication date: Feb. 2011, in 45 pages.

Lin, "MR-Apriori: Association Rules Algorithm Based on MapReduce", IEEE, 2014, pp. 141-144.

Meng et al., Efficient resource provisioning in compute clouds via VM multiplexing, Jun. 2010, 10 pages.

Merkel, "Docker: Lightweight Linux Containers for Consistent Development and Deployment", Linux Journal, vol. 2014 Issue 239, Mar. 2014, XP055171140, 16 pages.

Monteil, Coupling profile and historical methods to predict execution time of parallel applications. Parallel and Cloud Computing, Jul. 2013, <hal-01228236, pp. 81-89.

Nakajima, J., et al., Optimizing Virtual Machines Using Hybrid Virtualization, SAC '11, Mar. 21-25, 2011, TaiChung, Taiwan, pp. 573-578.

Qian, H., and D. Medhi, et al., Estimating Optimal Cost of Allocating Virtualized Resources With Dynamic Demand, ITC 2011, Sep. 2011, pp. 320-321.

Ryden et al., "Nebula: Distributed Edge Cloud for Data-Intensive Computing", IEEE, 2014, pp. 491-492.

Sakamoto, et al. "Platform for Web Services using Proxy Server"; Research Report from Information Processing Society, Mar. 22, 2002, vol. 2002, No. 31.

Search Query Report from IP.com, performed Dec. 2, 2020.

Search Query Report from IP.com, performed May 27, 2021.

Shim (computing), Wikipedia, https://en.wikipedia.org/w/index.php?title+Shim_(computing)&oldid+654971528, [retrieved on May 26, 2016], 2 pages.

Stack Overflow, Creating a database connection pool, Nov. 10, 2009, 4 pages.

Tan et al., Provisioning for large scale cloud computing services, Jun. 2012, 2 pages.

Tange, "GNU Parallel: The Command-Line Power Tool", vol. 36, No. 1, Jan. 1, 1942, pp. 42-47.

Vaghani, S.B., Virtual Machine File System, ACM SIGOPS Operating Systems Review 44(4):57-70, Dec. 2010.

(56) References Cited

OTHER PUBLICATIONS

Vaquero, L., et al., Dynamically Scaling Applications in the cloud, ACM SIGCOMM Computer Communication Review 41(1):45-52, Jan. 2011.
Wang et al., "Improving utilization through dynamic VM resource allocation in hybrid cloud environment", Parallel and Distributed V Systems (ICPADS), IEEE, Dec. 16, 2014-Dec. 19, 2014. Retrieved on Feb. 14, 2019, Retrieved from the internet: URL<https://ieeexplore.IEEE.org/stamp/stamp.jsp?tp=&arnumber=7097814, 8 pages.
Wikipedia "API" pages from date Apr. 7, 2015, retrieved using the WayBackMachine from https://web.archive.org/web/20150407191158/ https://en wikipedia.org/wiki/Application_programming_interface.
Wikipedia List_of_HTTP status_codes web page, retrieved from https://en.wikipedia.org/wiki/List_of_HTTP status_codes, retrieved on Sep. 10, 2019.
Wikipedia Recursion web page from date Mar. 26, 2015, retrieved using the WayBackMachine, from https://web.archive.org/web/20150326230100/https://en.wikipedia.org/wiki/Recursion_ (computer _science), 2015.
Wikipedia subroutine web page, retrieved from https://en.wikipedia.org/wiki/Subroutine, retrieved on Sep. 10, 2019.
Wood, Timothy, et al. "Cloud Net: dynamic pooling of cloud resources by live WAN migration of virtual machines." ACM Sigplan Notices 46.7 (2011): 121-132. (Year: 2011).
Wu et al., HC-Midware: A Middleware to Enable High Performance Communication System Simulation in Heterogeneous Cloud, Association for Computing Machinery, Oct. 20-22, 2017, 10 pages.
Yamasaki et al. "Model-based resource selection for efficient virtual cluster deployment", Virtualization Technology in Distributed Computing, ACM, Nov. 2007, pp. 1-7.
Yang, The Application of MapReduce in the Cloud Computing:, IEEE, 2011, pp. 154-156.
Yue et al., AC 2012-4107: Using Amazon EC2 in Computer and Network Security Lab Exercises: Design, Results, and Analysis, 2012, American Society for Engineering Education, Jun. 10, 2012.
Zhang et al., VMThunder: Fast Provisioning of Large-Scale Virtual Machine Clusters, IEEE Transactions on Parallel and Distributed Systems, vol. 25, No. 12, Dec. 2014, pp. 3328-3338.
Zheng, C., and D. Thain, Integrating Containers into Workflows: A Case Study Using Makeflow, Work Queue, and Docker, VTDC '15, Jun. 15, 2015, Portland, Oregon, pp. 31-38.
International Search Report and Written Opinion in PCT/US2015/052810 dated Dec. 17, 2015.
International Preliminary Report on Patentability in PCT/US2015/052810 dated Apr. 4, 2017.
Extended Search Report in European Application No. 15846932.0 dated May 3, 2018.
Office Action in Chinese Application No. 202110268031.5, dated Sep. 3, 2021.
Office Action in Canadian Application No. 2,962,633 dated May 21, 2020.
Office Action in Canadian Application No. 2,962,633 dated Jun. 18, 2021.
Office Action in European Application No. 19199402.9 dated Mar. 23, 2021.
International Search Report and Written Opinion in PCT/US2015/052838 dated Dec. 18, 2015.
International Preliminary Report on Patentability in PCT/US2015/052838 dated Apr. 4, 2017.
Extended Search Report in European Application No. 15847202.7 dated Sep. 9, 2018.
Extended Search Report in European Application No. 19199402.9 dated Mar. 6, 2020.
Office Action in Japanese Application No. 2017-516160 dated Jan. 15, 2018.
Notice of Allowance in Japanese Application No. 2017-516160 dated May 8, 2018.
Office Action in Canadian Application No. 2,962,631 dated May 19, 2020.

Office Action in Canadian Application No. 2,962,631 dated May 31, 2021.
Office Action in Indian Application No. 201717013356 dated Jan. 22, 2021.
Office Action in Japanese Application No. 2017-516168 dated Mar. 26, 2018.
International Search Report and Written Opinion in PCT/US2015/052833 dated Jan. 13, 2016.
International Preliminary Report on Patentability in PCT/US2015/052833 dated Apr. 4, 2017.
Extended Search Report in European Application No. 15846542.7 dated Aug. 27, 2018.
Office Action in Indian Application No. 201717019903 dated May 18, 2020.
International Search Report and Written Opinion in PCT/US2015/064071 dated Mar. 16, 2016.
International Preliminary Report on Patentability in PCT/US2015/064071 dated Jun. 6, 2017.
Office Action in Australian Application No. 2016215438 dated Feb. 26, 2018.
Notice of Allowance in Australian Application No. 2016215438 dated Nov. 19, 2018.
Office Action in Canadian Application No. 2,975,522 dated Jun. 5, 2018.
Notice of Allowance in Canadian Application No. 2,975,522 dated Mar. 13, 2020.
Office Action in Indian Application No. 201717027369 dated May 21, 2020.
International Search Report and Written Opinion in PCT/US2016/016211 dated Apr. 13, 2016.
International Preliminary Report on Patentability in PCT/US2016/016211 dated Aug. 17, 2017.
Office Action in Chinese Application No. 201680020768.2 dated May 14, 2021 in 23 pages.
Office Action in Chinese Application No. 201680020768.2 dated Sep. 24, 2021 in 20 pages.
First Examination Report for Indian Application No. 201717034806 dated Jun. 25, 2020.
International Search Report and Written Opinion in PCT/US2016/026514 dated Jun. 8, 2016.
International Preliminary Report on Patentability in PCT/US2016/026514 dated Oct. 10, 2017.
International Search Report and Written Opinion in PCT/US2016/026520 dated Jul. 5, 2016.
International Preliminary Report on Patentability in PCT/US2016/026520 dated Oct. 10, 2017,
Office Action in Chinese Application No. 2016800562398 dated Jun. 18, 2021.
International Search Report and Written Opinion in PCT/US2016/054774 dated Dec. 16, 2016.
Office Action in European Application No. 16781265.0 dated Jul. 13, 2020.
Office Action in Indian Application No. 201817013748 dated Nov. 20, 2020.
International Preliminary Report on Patentability in PCT/US2016/054774 dated Apr. 3, 2018.
Office Action in Chinese Application No. 201680072794X dated Jun. 22, 2021.
Office Action in European Application No. 16823419.3 dated Mar. 12, 2021.
International Search Report and Written Opinion in PCT/US2016/066997 dated Mar. 20, 2017.
International Preliminary Report on Patentability in PCT/US2016/066997 dated Jun. 26, 2018.
Office Action in Chinese Application No. 201780022789.2 dated Apr. 28, 2021.
Office Action in European Application No. 17776325.7 dated Apr. 12, 2021.
International Search Report and Written Opinion in PCT/US/2017/023564 dated Jun. 6, 2017.
International Preliminary Report on Patentability in PCT/US/2017/023564 dated Oct. 2, 2018.

(56) References Cited

OTHER PUBLICATIONS

Office Action in Chinese Application No. 2017800451968 dated May 26, 2021.
Office Action in European Application No. 17740533.9 dated May 4, 2021.
International Search Report and Written Opinion in PCT/US2017/040054 dated Sep. 21, 2017.
International Preliminary Report on Patentability in PCT/US2017/040054 dated Jan. 1, 2019.
International Search Report and Written Opinion in PCT/US2017/039514 dated Oct. 10, 2017.
International Preliminary Report on Patentability in PCT/US2017/039514 dated Jan. 1, 2019.
Extended European Search Report in application No. 17776325.7 dated Oct. 23, 2019.
Office Action in European Application No. 17743108.7 dated Jan. 14, 2020.
Office Action in European Application No. 17743108.7 dated Dec. 22, 2020.
International Search Report and Written Opinion dated Oct. 15, 2019 for International Application No. PCT/US2019/039246 in 16 pages.
International Preliminary Report on Patentability dated Dec. 29, 2020 for International Application No. PCT/US2019/039246 in 8 pages.
International Search Report for Application No. PCT/US2019/038520 dated Aug. 14, 2019.
International Preliminary Report on Patentability for Application No. PCT/US2019/038520 dated Dec. 29, 2020.
International Preliminary Report on Patentability and Written Opinion in PCT/US2019/053123 dated Mar. 23, 2021.
International Search Report and Written Opinion in PCT/US2019/053123 dated Jan. 7, 2020.
International Search Report for Application No. PCT/US2019/065365 dated Mar. 19, 2020.
International Preliminary Report on Patentability for Application No. PCT/US2019/065365 dated Jun. 8, 2021.
International Search Report for Application No. PCT/US2020/039996 dated Oct. 8, 2020.
International Search Report for Application No. PCT/US2020/062060 dated Mar. 5, 2021.

\* cited by examiner

STREAMING ANALYTICS USING A SERVERLESS COMPUTE SYSTEM

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some scenarios, virtual machine instances may be configured according to a number of virtual machine instance types to provide specific functionality. For example, various computing devices may be associated with different combinations of operating systems or operating system configurations, virtualized hardware resources and software applications to enable a computing device to provide different desired functionalities, or to provide similar functionalities more efficiently. These virtual machine instance type configurations are often contained within a device image, which includes static data containing the software (e.g., the OS and applications together with their configuration and data files, etc.) that the virtual machine will run once started. The device image is typically stored on the disk used to create or initialize the instance. Thus, a computing device may process the device image in order to implement the desired software configuration.

One example use of data centers is to process or analyze large data sets, which may be impractical to analyze using a single computing device. A specific type of data analytics is streaming data analytics, which conducts processing or analysis on a data stream. In this context, a data "stream" is a set of data that is periodically or continuously updated, rather than being available as a collection. A common goal of streaming analytics is to process data in "real time"— that is, as it is added to the stream, with minimal delay. Thus, streaming analytics may be used to keep real time statistics of data points on a stream, as opposed to, e.g., waiting for all data points to exist before conducting a statistical analysis.

DETAILED DESCRIPTION

Figure 1:
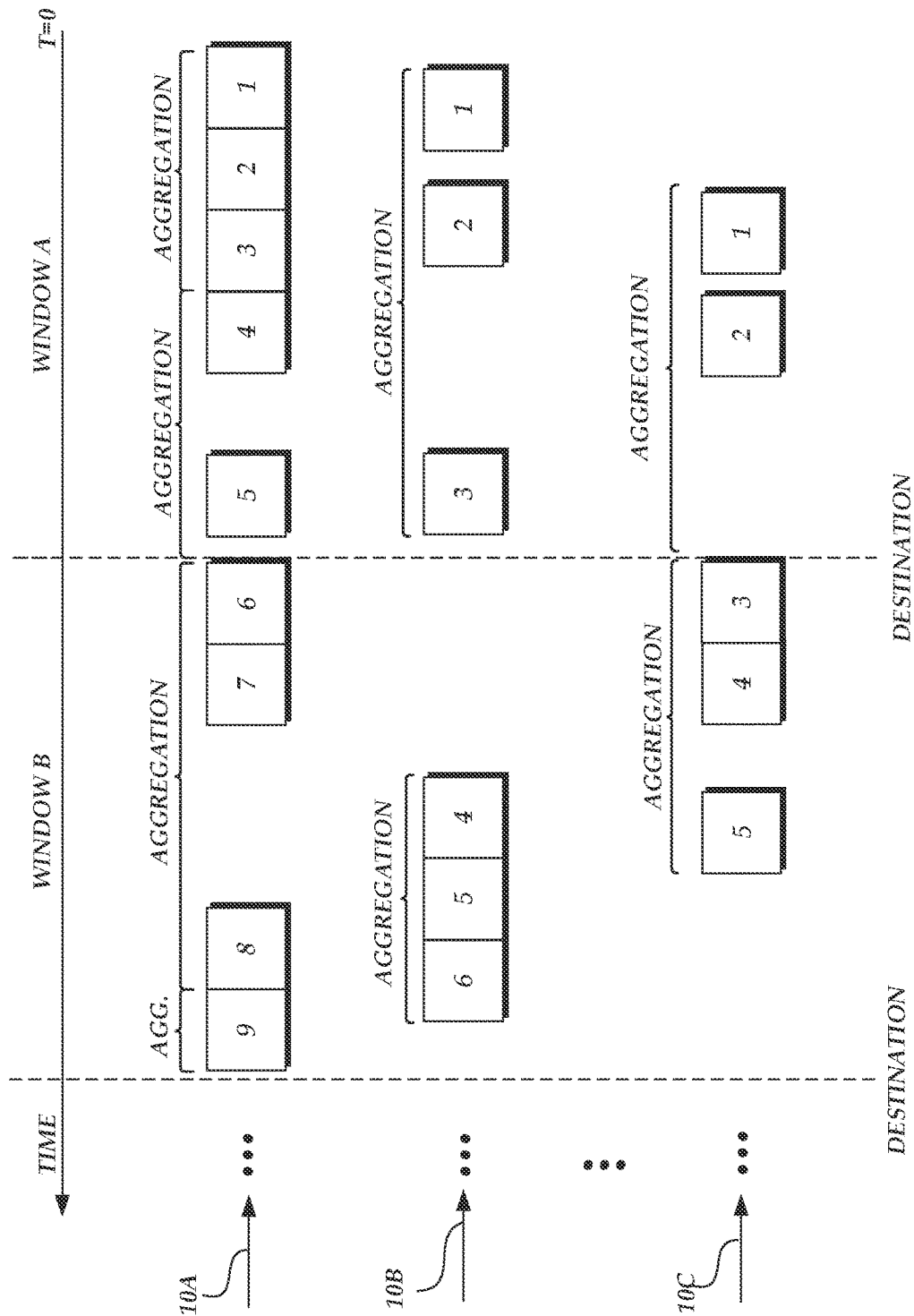
FIG. 1 is an illustrative visualization of data streams against which streaming analytics can be conducted, including visualizations of windows and aggregation groups applied to the data streams for purposes of conducting streaming analytics.

Generally described, aspects of the present disclosure relate to conducting streaming analytics on a serverless compute system. More specifically, the present disclosure enables code executions on a serverless compute system to analyze items (e.g., "messages") within a data stream, and maintain "running" calculations regarding those items, such as counts, averages, and the like. The specific analysis may be established within user-defined code, and thus tailored to the needs of an individual user. Embodiments of the present disclosure can enable a user to specify various criteria for streaming analysis, such as time windows over which analysis is to be conducted, a maximum number of data size of items to be analyzed, and the like. These embodiments can then facilitate submission of items within the stream to a serverless compute system, such that analysis—as specified within user defined code—is conducted according to the various criteria established by the user. In this way, embodiments of the present disclosure can facilitate rapid development and deployment of streaming analytics.

As described herein, a serverless compute system (which may also be referred to as a "serverless code execution system" or an "on-demand code execution system") enables rapid execution of code, which may be supplied by users of the serverless compute system. On submitting code, the serverless compute system can then enable the user to submit "calls" or "invokes" to execute the code, at which point the serverless compute system will generate an execution environment for the code and execute the code within the environment to provide the desired functionality. The environment can then be destroyed shortly after providing the desired functionality, such that a user is responsible only for resources used during execution. These execution times are often very short, making serverless computing highly efficient, particularly for tasks with varying demand levels. However, because the serverless compute system (and not the end user) generally handles management of execution environments, including selection of a host device on which to place the environment, an end user is generally not enabled to guarantee that a particular invocation will result in execution in a particular environment. For this reason, serverless executions are often designed or even restricted to being stateless—such that the result of one execution of code does not depend on processing done during a prior execution of the code.

In the context of streaming analytics, the stateless nature of serverless executions can be problematic, as many streaming analyses specifically depend on state. For example, conducting a running count or average of data items in a stream requires a system, in evaluating one or more new data items, to have knowledge of state regarding counts or averages of older data items. While the system may instead only process data items in batches (e.g., without regard to state related to prior items), this effectively transforms the analysis to batch, rather than streaming, analysis. Accordingly, in a default configuration, it may not be possible conduct streaming analytics on a serverless compute system.

Embodiments of the present disclosure address the above-noted issues by enabling typically stateful processing, such as streaming analytics, to be implemented within stateless execution environments, such as those provided by a serverless compute system. As will be described in more detail below, embodiments of the present disclosure enable an intermediary device to maintain state information related to iterative data processing (e.g., streaming analytics), and to submit the state information in each request to execute code on a serverless compute system. The intermediary device can obtain updated state information in response to each call, and include the updated state information in a next call. In this manner, execution environments on the serverless compute system are relieved of an obligation to maintain state information, and may continue to operate statelessly. However, state information can nevertheless be maintained while processing a set of data, enabling successful stateful analysis of streaming data. As will be described below, the intermediary device may be configured to ensure resiliency of operation, such that failures within a system processing a data set can be identified and corrected. Moreover, the intermediary device can be configured to ensure efficient resiliency, such that providing resiliency does not have a substantial negative impact on the ability of the system to process streaming data.

In one embodiment, the intermediary device is a poller device, which operates to retrieve items from a data stream, and to pass the items for processing to a code execution on a serverless compute system. Illustratively, a poller device in accordance with embodiments of the present disclosure may determine initial state information for processing data items on the stream (e.g., as a null state), retrieve an initial set of items from the stream, and iteratively submit those items to the serverless compute system along with current state information representing a state of processing of the stream. The poller device can be configured to receive in response to each call updated state information, which information can be included within subsequent calls. Because the state information for the stream is passed in each call, environments on serverless compute system are not themselves required to maintain state information. For this reason, no affinity is generally required between a poller device and an environment in which a call is processed. Rather, the serverless compute system can route calls from the poller device to any suitable environment, increasing flexibility of the serverless compute system in executing code corresponding to the call. The poller device can be configured to periodically save the state information to a resilient storage system (e.g., a network storage location with built-in redundancy), and to resume processing based on that saved state information in the event of a failure. Thus, maintaining state information at a poller device provides an efficient mechanism for enabling stateful data processing at a serverless compute system.

While other mechanisms for enabling stateful data processing at a serverless compute system are contemplated herein, these other mechanisms are generally less desirable than maintaining state information at an intermediary (e.g., poller) device. For example, it is conceivable that a serverless compute system is configured to provide affinity for multiple calls to execute a given set of code, such that each call is routed to the same execution environment. It is further conceivable that a serverless compute system enables each such environment to maintain local state information, thus enabling stateful execution of code within the environment. However, this approach significantly decreases flexibility of operation of the serverless compute system, requiring that the system maintain execution environments for long periods of time. Moreover, this approach may not be well suited to address issues that frequently arise in distributed processing systems, such as the need to provide resiliency of operation or the need to scale up or down a number of environments in response to changing operational load. For example, to address these issues, the serverless compute system may be required to frequently save state information of each environment, significantly increasing resource usage of the system. The system may also be required to provide for transferring of state information between environments during scale up or scale down events, increasing the complexity of managing such environments. Another possible mechanism for retaining state information between processing of calls is to configure each execution environment, during processing of a call, to write its state information to a persistent external location, such as network data storage. Thus, subsequent executions may retrieve the state information from the persistent location to facilitate processing of subsequent calls. However, in distributed systems, writing to an external storage location is generally considered a "heavy weight" operation, as it can significantly increase the computing resources used to process a call. For example, writing to a network location may require initiation of a transport control protocol (TCP) session with the network location, a process that can take significant time and resources (in terms of the resources that would otherwise be required to process a single call). Where the number of calls is large (e.g., when high throughput data streams), the additional overhead required for such a heavy weight operation can be significant.

Embodiments of the present disclosure enable state information to be maintained between processing of calls without these drawbacks. For example, an intermediary device can pass state information for a call at the same time that the call is submitted to a serverless compute system, and can receive updated state information as a response to that call. Thus, no additional network communications are required by the serverless compute system. Moreover, the intermediary device can provide resiliency by saving state information periodically, at a periodicity that can be adjusted based on the resources available to the device and overhead required to resume operation in the event of a failure. Specifically, because the intermediary device is capable of a "long term" view of processing of a stream of data items, the device is not required to ensure state information is saved after each call, as the serverless compute system or an external data store might be.

The serverless compute system, as described in detail herein, may provide a network-accessible service enabling users to submit or designate computer-executable code to be executed by virtual machine instances (or other execution environments, such as containers providing operating-system level virtualization) on the serverless compute system. Each set of code on the serverless compute system may define a "task" or "function" and implement specific functionality corresponding to that function when executed on a virtual machine instance of the serverless compute system. Individual implementations of the function on the serverless compute system may be referred to as an "execution" of the function (or a "function execution"). The serverless compute system can further enable users to trigger execution of a function based on a variety of potential events, such as detecting new data at a network-based storage system, transmission of an application programming interface ("API") call to the serverless compute system, or transmission of a specially formatted hypertext transport protocol ("HTTP") packet to the serverless compute system. Thus, users may utilize the serverless compute system to execute any specified executable code "on-demand," without requiring configuration or maintenance of the underlying hardware or infrastructure on which the code is executed. Further, the serverless compute system may be configured to execute functions in a rapid manner (e.g., in under 100 milliseconds [ms]), thus enabling execution of functions in "real-time" (e.g., with little or no perceptible delay to an end user).

Because the serverless compute system can provide the ability to execute a function on-demand, without configuration of an underlying device on which to execute the code, the serverless compute system can provide an excellent platform on which to implement streaming analytics. For example, the serverless compute system can enable a user to implement streaming analytics effectively without regard for the volume of data published to an input data stream, as scaling of compute resources to process the data can be handled by the serverless compute system, rather than being preconfigured by a user. The present disclosure can enable the use of a serverless compute system to conduct streaming analytics by providing an efficient way of maintaining state information for such data analysis, without requiring that such state information be maintained within environments of the serverless compute system or persisted by such environments to additional external locations.

In accordance with embodiments of the present disclosure, a poller device as disclosed herein can, in addition or alternatively to providing a mechanism to maintain state between serverless function invocations, provide a variety of scheduling and work distribution functionalities to enable streaming analytics.

For example, in many cases of streaming analytics, end users may wish to conduct analyses with respect to certain subsets of data on the stream, which may be specified with respect to windows. For example, an end user may wish to analyze items in each window of 30 seconds, 1 minute, 5 minutes, 15 minutes, etc. Windows may be fixed, such that they occur on set intervals. For example, a user may wish to know an average count of errors indicated on a data stream at each 5 minute interval. Additionally or alternatively, windows may be sliding, such that streaming analysis logically considers all possible windows of a given length. For example, an end user may wish to know whether the average count of errors in any possible 5 minute span exceeds a threshold value. Embodiments of the present disclosure can enable a poller device to provide for such windowing. More specifically, a poller device may group items within a data stream into window sets, and pass these window sets to a serverless compute system for processing via a processing function, sometimes referred to herein as an "aggregation" function. The processing function may conduct analysis on the window set, and return state information to the poller device. At the end of each window set, the poller device may pass the final state information for the window into window finalization function, sometimes referred to herein as a "destination" function, which may take action with respect to the final state for the window set, such as by reporting that state to an end user. To facilitate fixed windowing, the poller device may initialize each window based on attribute of each item in the stream, such as a timestamp indicating the time at which the item was added to the stream. For example, to implement 5 minute fixed windows, the poller device may group into a first window any items on the stream with a timestamp between 00:00:00 and 00:05:00 (in HH:MM:SS format, where HH indicates hours, MINI minutes, and SS seconds), cause these items to be processed by an aggregation function to result in state, and at the end of the time window, pass the state to a destination function for final processing. To implement sliding windows, the poller device may create new, potentially overlapping windows for each item on the stream. For example, if an item is added to the stream with a timestamp of 00:00:30, the poller device can initialize a window from 00:00:30 to 00:05:30 (for 5 minute windows) and consider the item as included within that window. If a second item is added to the stream with a timestamp of 00:00:45, the poller device may consider the second item to exist within the first window, and also initialize a second window from 00:00:45 to 00:05:45, with the second item also included within the second window. The poller device can then maintain state information for each window, and, similarly to as noted above, pass items from each window to aggregate and destination functions for processing.

In some instances, the data within a stream during a given window may exceed the capacity of a single function invocation on the serverless compute system. For example, each invocation on the serverless compute system may be limited in computing resources, such as memory, processing cycles, network bandwidth, or the like. In some instances, each invocation on the serverless compute system may be limited in compute time. For example, each invocation may be allowed to execute for no more than a threshold period of time, such as 15 minutes. To address these restrictions, it may be preferable to divide a window set (items in a stream corresponding to a particular time window) for processing. For example, it may be preferable to limit the number of items processed by an instance of an aggregation function, such as by specifying a maximum number of data items, a maximum data size of those items, or the like. In embodiments of the present disclosure, a poller device may provide for such division, by accepting grouping criteria that indicate when to submit a subset of data items from a window set to an aggregation function. Illustratively, if an end user specifies that a maximum of 3 data items are to be processed by each instance of an aggregation function, the poller device may detect when a particular window set has three data items, and submit those data items for processing. In the manner noted above, the poller device may maintain state information resulting from processing the 3 data items, and pass that state information to a next aggregation function invocation for the window set. This batching may continue until all data items for the window set are processed, at which point a destination function for the window can be invoked. As a result, state information for the window can be passed to the destination function, without requiring that the aggregation function support unbounded data input.

To better illustrative scheduling and work distribution functionalities that may be implemented by a poller device as disclosed herein, FIG. 1 shows illustrative sets of data items and relative timing of those data items pushed to three data streams 10, denoted as stream 10A, B, and N in FIG. 1. Each stream includes a number of data items beginning at data item 1 and increasing monotonically. In FIG. 1, the first data item of each stream 10 (data item '1') is shown to the far right, with additional data items joining the stream 10 from the left. Thus, time begins from a given starting point (t=0) and increases to the left. The relative position of each data item in FIG. 1 therefore shows a time of the data item in the stream. Illustratively, the time may be a timestamp added to the data item by operation of data streaming system, indicating time of receipt of the data item, a timestamp field included by an upstream device publishing data items to the stream, etc. In FIG. 1, it is assumed that each stream 10 is subject to the same analysis criteria, including criteria for invoking an aggregation function and window criteria for establishing windows. Specifically, in FIG. 1 it is assumed that fixed windows of a given length are established (corresponding to the dashed lines of FIG. 1), and that an aggregation function supports a maximum of three data items per invocation. In practice, different streams may be associated with different analysis criteria, including different window lengths, different window types (e.g., sliding windows), and different aggregation function limits.

The processing for each stream 10 caused by operation of the poller device is shown in FIG. 1. Specifically, groupings of data items of a stream into an "aggregation" indicate that these data items are passed to an invocation of an aggregation function on a serverless compute system, along with state information maintained for a current window (if any). Illustratively, with respect to stream 10A, the poller device detects three data items during Window A, which corresponds to the maximum number of data items per invocation of the aggregation function. The poller device therefore passes data items 1-3 an invocation of an aggregation function. As these are the first data items in the associated window, the poller device may pass no state to the aggregation function, or may pass an indicator of null state. The poller device additionally detects two other data items—numbers 4 and 5—in the stream 10A. While these data items do not exceed the maximum per-invocation of the aggregation function, they represent the final data items within Window A. Therefore, the poller device submits data items 4 and 5 to the aggregation function, along with state information for the window (e.g., that returned as a result of processing data items 1-3). The poller device then obtains final state information for the window. As the window has closed, the poller device then invokes the destination function for the window, passing to it the final state information for the window. Accordingly, data analytics for the window is completed.

Similar interactions can occur with respect to other streams 10B and 10N (which may represent any number of streams). For example, with respect to stream 10B, the poller device may pass data items 1-3 to an execution of the aggregation function, since the data items represent the maximum number per-invocation of the aggregation function. As no additional data items exist in Window A subsequent to data item 3 of stream 10B, the poller device invokes the destination function with the state information passed back from that aggregation function. With respect to stream 10C, the poller device may detect the end of Window A prior to submitting any data items for processing. The poller device can therefore submit all unprocessed data items (specifically, items 1 and 2) to the aggregation function for processing. After obtaining a result, the poller can pass the result to the destination function as final window state.

Interactions similar to those above can occur for each time window. For example, with respect to stream 10A, aggregation functions can iteratively be called for items 6-8 and 9, with a result of the second aggregation function being passed to a destination function. With respect to streams 10B and 10N, the aggregation function can be called for data items 4-6 and 3-5, respectively, with a result of each aggregation function being passed to the corresponding destination function for the stream. Thus, the poller device can continue to provide analytics for each stream 10 as data items are published to the stream.

While FIG. 1 is described with respect to distinct aggregation and destination functions, in some instances these two functions may be merged. For example, a single function may be provided that implements functionality of both aggregation and destination functions, and accepts as input a flag that distinguishes between these functionalities. Accordingly, the poller device may use a first flag value (e.g., 0) to invoke the function to implement aggregation functionality, and a second flag value (e.g., 1) to invoke the function to implement destination functionality. As another example, a single function may be provided that implements functionality of both aggregation and destination functions, and accepts a flag that indicates whether a current set of data items is the final set for a window. The function may then be configured to process that set of data items (if any), and implement destination functionality for the window. Thus, separate description of aggregation and destination functions should not be viewed to indicate that these functions must be distinct.

As will be appreciated by one of skill in the art in light of the present disclosure, the embodiments disclosed herein improves the ability of computing systems, such as serverless compute systems, to implement streaming data analytics. More specifically, embodiments of the present disclosure enable state information to be efficiently maintained between code executions on serverless computing systems, without requiring that such state information be maintained in an execution environment of the systems. Embodiments of the present disclosure further provide mechanisms for passing data items to serverless code executions, by use of a poller device that provides for scheduling and work distribution to serverless code executions based on data items within a data stream. Moreover, the presently disclosed embodiments address technical problems inherent within computing systems; specifically, the need to maintain state information when conducting data analytics, the difficulty of maintaining such information without increasing computing resources used to process a data stream or decreasing flexibility in where such processing occurs, and the need to orchestrate serverless computing systems to implement streaming analytics over various time windows. These technical problems are addressed by the various technical solutions described herein, including the use of a poller device to orchestrate serverless compute executions to implement streaming analytics, while maintaining state information to facilitate those analytics. Thus, the present disclosure represents an improvement on existing systems and computing systems in general.

Figure 2:
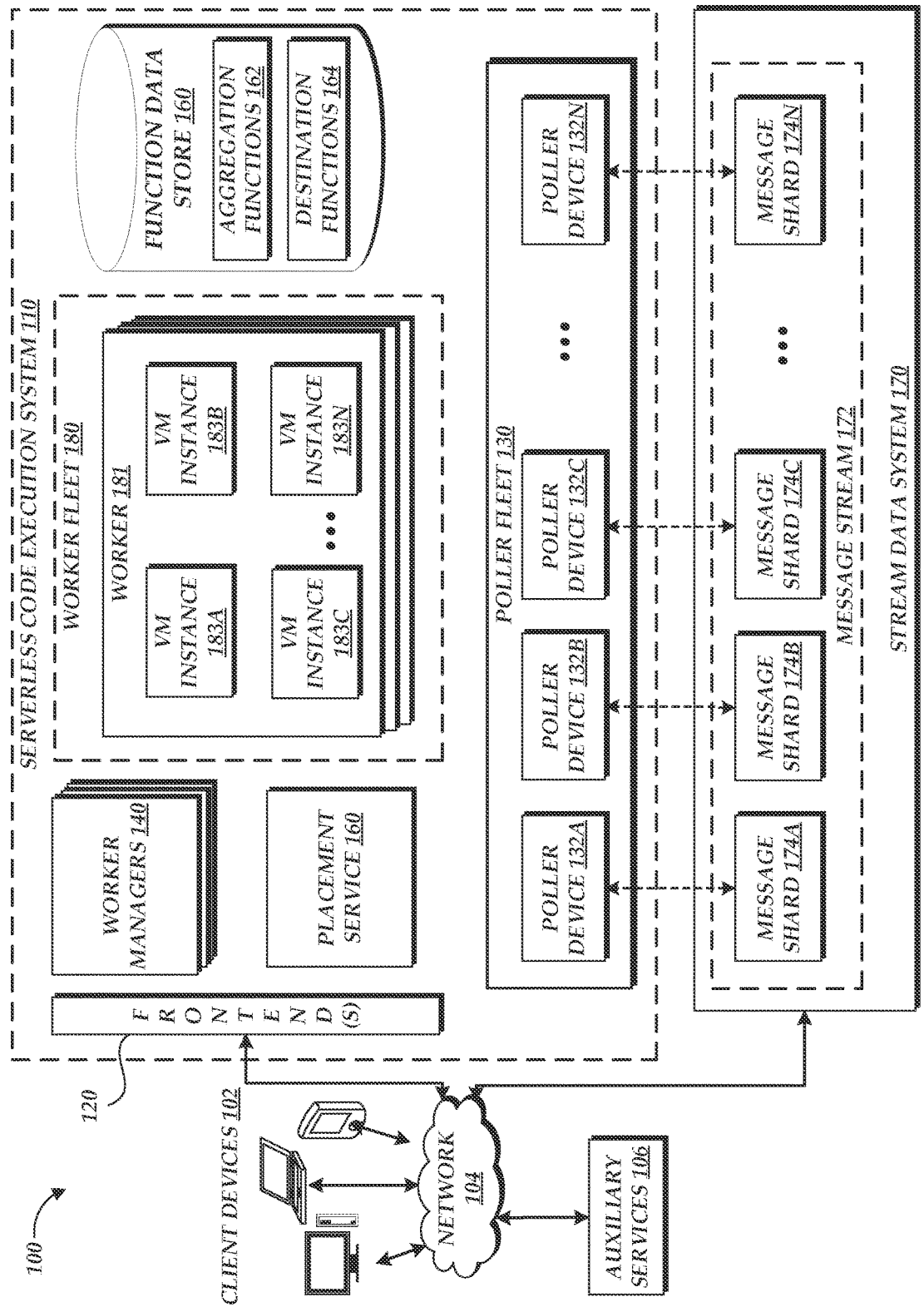
FIG. 2 is a block diagram depicting an illustrative environment in which streaming analytics can be conducted against a data stream by invocation of serverless functions on a serverless compute system.

FIG. 2 is a block diagram of an illustrative operating environment 100 for a serverless code execution system 110, in which a poller fleet 130 may provide for poller devices 132 that facilitate, on behalf of client devices 102, streaming analytics of data items published to a message stream 172 of a stream data system 170.

By way of illustration, various example client devices 102 are shown in communication with the serverless code execution system 110, including a desktop computer, laptop, and a mobile phone. In general, the client devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The serverless code execution system 110 may provide the user computing devices 102 with one or more user interfaces, command-line interfaces (CLI), application programming interfaces (API), and/or other programmatic interfaces for generating and uploading user-executable source code (e.g., as part of a disk image), invoking the user-provided source code (e.g., submitting a request to execute the source code on the serverless code execution system 110), scheduling event-based code executions or timed code executions, tracking the user-provided source code, and/or viewing other logging or monitoring information related to their requests and/or source code. Although one or more embodiments may be described herein as using a user interface, it should be appreciated that such embodiments may, additionally or alternatively, use any CLIs, APIs, or other programmatic interfaces.

The illustrative environment 100 further includes one or more auxiliary services 106, which can interact with the serverless code execution environment 110 to implement desired functionality on behalf of a user. Auxiliary services 106 can correspond to network-connected computing devices, such as servers, which generate data accessible to the serverless code execution environment 110 or otherwise communicate to the serverless code execution environment 110. For example, the auxiliary services 106 can include web services (e.g., associated with the user computing devices 102, with the serverless code execution system 110, or with third parties), databases, really simple syndication ("RSS") readers, social networking sites, or any other source of network-accessible service or data source. In some instances, auxiliary services 106 may be invoked by code execution on the serverless code execution system 110, such as by API calls to the auxiliary services 106. In some instances, auxiliary services 106 may be associated with the serverless code execution system 110, e.g., to provide billing or logging services to the serverless code execution system 110. In some instances, auxiliary services 106 actively transmit information, such as API calls or other task-triggering information, to the serverless code execution system 110. In other instances, auxiliary services 106 may be passive, such that data is made available for access by the serverless code execution system 110. For example, components of the serverless code execution system 110 may periodically poll such passive data sources, and trigger execution of code within the serverless code execution system 110 based on the data provided. While depicted in FIG. 2 as distinct from the user computing devices 102 and the serverless code execution system 110, in some embodiments, various auxiliary services 106 may be implemented by either the user computing devices 102 or the serverless code execution system 110.

The illustrative environment 100 further includes a stream data system 170. As discussed above, the stream data processing system can provides the ability for upstream devices to place data onto a message stream 172, such as by publishing "messages" onto the stream 172, which may be designated based on a specific "topic." While a single stream 172 is shown in FIG. 1, the system 170 may provide multiple streams on behalf of multiple parties. The system 170 can make messages within the stream 172 available to downstream devices, often in a "first-in-first-out" ("FIFO") or nearly FIFO order. In some instances, the stream data system 170 "pushes" messages to downstream devices. In other instances, downstream devices "pull" messages from the message stream 172 on request. Generally, the stream data system 170 is configured to provide resiliency, such that data successfully published to the stream is unlikely to be lost due to failures of devices of the stream data system 170. For example, the system 170 may duplicate messages placed onto the stream 172 onto multiple computing devices used to implement the stream (e.g., physical computing devices or virtual devices implemented on physical hosts). Moreover, the stream data system 170 can be configured to provide parallelization of the devices that maintain the message stream 172. For example, a user configuring a message stream may designate a partition key for the stream, used to divide the stream into sub-streams, each sub-stream handled by one or more parallelized devices. The sub-streams are shown in FIG. 1 as message shards 174A-N. Each message shard 174 can generally represent one or more computing devices configured to obtain and make available a subset of messages on the message stream, selected by the system 170 according to the partition key and a volume of messages on the stream 170 (e.g., such that additional shards are created, or excess shards are destroyed, based on a capacity of the shards 174 to service messages on the stream 172). In some instances, a stream 172 may contain only a single shard. Examples of stream data processing systems known in the art include the AMAZON™ KINESIS™ network service and the APACHE™ KAFKA™ system.

The client devices 102, auxiliary services 106, stream data system 170, and serverless code execution system 110 may communicate via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The serverless code execution system 110 and stream data system 170 are depicted in FIG. 1 as operating in a distributed computing environment including several computer systems that are interconnected using one or more computer networks (not shown in FIG. 1). Either or both of the serverless code execution system 110 and stream data system 170 could also operate within a computing environment having a fewer or greater number of devices than are illustrated in FIG. 1. Thus, the depiction of the serverless code execution system 110 and stream data system 170 in FIG. 1 should be taken as illustrative and not limiting to the present disclosure. For example, the serverless code execution system 110 and stream data system 170 or various constituents thereof could implement various Web services components, hosted or "cloud" computing environments, and/or peer to peer network configurations to implement at least a portion of the processes described herein.

Further, the serverless code execution system 110 and stream data system 170 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

In the example of FIG. 1, the serverless code execution system 110 and stream data system 170 are illustrated as connected to the network 104. In some embodiments, any of the components within the serverless code execution system 110 and stream data system 170 can communicate with other components of the serverless code execution system 110 and stream data system 170 via the network 104. In other embodiments, another network (such as a private network not shown in FIG. 1) may enable communication between components within each of the serverless code execution system 110 and stream data system 170 or between those systems.

In FIG. 2, users, by way of client computing devices 102, may interact with the serverless code execution system 110 to provide source code, and establish rules or logic defining when and how such code should be executed on the serverless code execution system 110, thus establishing a "task" or "function." For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. In order to avoid the complexity of this process, the user may alternatively provide the code to the serverless code execution system 110, and request that the serverless code execution system 110 execute the code using one or more execution environments that are managed by the system 110. The serverless code execution system 110 can handle the acquisition and configuration of compute capacity (e.g., containers, instances, etc., which are described in greater detail below) based on the code execution request, and execute the code using the compute capacity. The serverless code execution system 110 may automatically scale up and down based on the volume of request to execute code, thereby relieving the user from the burden of having to worry about over-utilization (e.g., acquiring too little computing resources and suffering performance issues) or under-utilization (e.g., acquiring more computing resources than necessary to run the code, and thus overpaying). In accordance with embodiments of the present disclosure, the functions established by a user may correspond to code executable to implement streaming analytics for data items on the data stream 172, including an aggregation function to generate state information for data items within a time window and a destination function to handle a result corresponding to that time window.

To enable interaction with the serverless code execution system 110, the system 110 includes multiple frontends 120, which enable interaction with the serverless code execution system 110. In an illustrative embodiment, the frontends 120 serve as a "front door" to the other services provided by the serverless code execution system 110, enabling users (via user computing devices 102) to provide, request execution of, and view results of computer executable source code. The frontends 120 include a variety of components to enable interaction between the serverless code execution system 110 and other computing devices. For example, each frontend 120 may include a request interface providing user computing devices 102 with the ability to upload or otherwise communication user-specified code and associated data sets to the serverless code execution system 110 (e.g., in the form of a disk image) and to thereafter request execution of that code. In one embodiment, the request interface communicates with external computing devices (e.g., user computing devices 102, auxiliary services 106, etc.) via a graphical user interface (GUI), CLI, or API. The frontends 120 process the requests and makes sure that the requests are properly authorized. For example, the frontends 120 may determine whether the user associated with the request is authorized to access the source code specified in the request.

References to source code as used herein may refer to any program code (e.g., a program, routine, subroutine, thread, etc.) written in a specific program language. In the present disclosure, the terms "source code," "user code," and "program code," may be used interchangeably. Source code which has been compiled for execution on a specific device is generally referred to herein as "machine code." Both "source code" and "machine code" are representations of the same instructions, which may be collectively referred to as "code." Such code may be executed to achieve a specific function, for example, in connection with a particular web application or mobile application developed by the user. As noted above, individual collections of code (e.g., to achieve a specific function) are referred to herein as "tasks" or "functions," while specific executions of that code are referred to as "task executions," "function executions," "code executions," or simply "executions." Source code for a task may be written, by way of non-limiting example, in JavaScript (e.g., node.js), Java, Python, and/or Ruby (and/or another programming language). Tasks may be "triggered" for execution on the serverless code execution system 110 in a variety of manners. In one embodiment, a user or other computing device may transmit a request to execute a task may, which can generally be referred to as "call" to execute of the task (e.g., a "task call," a "function call," etc.). Such calls may include an identifier of the task to be executed and one or more arguments to be used for executing the task. A request interface of the frontend 120 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface.

Prior to calling for execution of a function, an end user may submit (e.g., to a frontend 120) code for the function and associated data to be used to execute the function. In one embodiment, the code is provided in the form of a disk image containing the code and other data that the code may use during execution. Illustratively, creation of a function may result in the frontend 120 creating metadata for the function, which defines for example the user creating the function, the disk image used to facilitate execution of the function, trigger conditions for the function, and the like. In one embodiment, functions may be versioned, with function metadata identifying the available versions and at least some other metadata for a function may vary across versions. For example, different versions may be associated with different disk images. Function data and metadata is illustratively stored in the function data store 160. The function data store 160 correspond to any persistent data store. In one embodiment, the function data store 160 is implemented as logical storage on a cloud storage service, such as an object storage system. An example of such an object storage system is AMAZON™'s SIMPLE STORAGE SERVICE™ (or "S3™").

In accordance with embodiments of the present disclosure, user-submitted code may correspond to functions for conducting streaming analytics, such as aggregation functions 162 and destination functions 164. The functions may be embodied in computer-executable code submitted to the execution system 110. In one embodiment, the aggregation function 162 implements data analysis, accepting data items from a data stream and state information for a current window (if any), and producing new state information for the window. The specific functionalities of an aggregation function may vary according to the data to be processed and a desired result. However, in general terms, an aggregation function may aggregate data items within a window and provide an aggregate result. For example, an aggregation function may count instances of a field value within data items, provide an average of a numerical field value, provide another statistical measure of matching field values, etc. In accordance with embodiments of the present disclosure, the aggregation function maintains state within a window, such as a fixed or sliding window. A final execution of the aggregation function with respect to a given window provides final state for that window, which may be passed to a destination function 164, representing code executable to handle that final state. For example, the destination function may evaluate the state to determine a result (e.g., whether an alert should or should not be sent), publish the state to a network destination, etc. Thus, the destination function 164 enables a result of streaming analytics to be provided for a given window. While shown as distinct functions, the aggregation and destination functions 162 and 164 may in some instances be merged as a single function. Both functions 162 and 164 may be stored within the function data store 160.

After a user has created a function on the serverless code execution system 110, the system 110 may accept calls to execute that function. To calls to execute a function, the frontend 120 can include an execution queue, which can maintain a record of requested task executions. Illustratively, the number of simultaneous function executions by the serverless code execution system 110 is limited, and as such, new function executions initiated at the serverless code execution system 110 (e.g., via an API call, via a call from an executed or executing function, etc.) may be placed on the execution queue and processed, e.g., in a first-in-first-out order. In some embodiments, the serverless code execution system 110 may include multiple execution queues, such as individual execution queues for each user account. For example, users of the serverless code execution system 110 may desire to limit the rate of function executions on the serverless code execution system 110 (e.g., for cost reasons). Thus, the serverless code execution system 110 may utilize an account-specific execution queue to throttle the rate of simultaneous function executions by a specific user account. In some instances, the serverless code execution system 110 may prioritize function executions, such that function executions of specific accounts or of specified priorities bypass or are prioritized within the execution queue. In other instances, the serverless code execution system 110 may execute functions immediately or substantially immediately after receiving a call for that function, and thus, the execution queue may be omitted.

In addition to functions executed based on explicit user calls and data from auxiliary services 106, the serverless code execution system 110 may in some instances operate to trigger execution of functions independently. For example, the serverless code execution system 110 may operate (based on instructions from a user) to trigger execution of a function at each of a number of specified time intervals (e.g., every 10 minutes).

The frontend 120 can further includes an output interface configured to output information regarding the execution of functions on the serverless code execution system 110. Illustratively, the output interface may transmit data regarding function executions (e.g., results of a function, errors related to the function execution, or details of the function execution, such as total time required to complete the execution, total data processed via the execution, etc.) to the user computing devices 102 or to auxiliary services 106, which may include, for example, billing or logging services. The output interface may further enable transmission of data, such as service calls, to auxiliary services 106. For example, the output interface may be utilized during execution of a function to transmit an API request to an external service 106 (e.g., to store data generated during execution of the function).

Code executions triggered on the serverless code execution system 110 of FIG. 1 are executed by execution environments hosted by a set of workers 181 within a worker fleet 180. Each worker 181 is illustratively a host device configured to host multiple execution environments, which in FIG. 1 are virtual machine instances 183A-N. Execution environments may alternatively include software containers, sometimes referred to as "OS-level virtualization," another virtualization technology known in the art. Thus, where references are made herein to VM instances 183, it should be understood that (unless indication is made to the contrary) a container may be substituted for such instances 183.

As used herein, the term "virtual machine instance" is intended to refer to an execution of software or other executable code that emulates hardware to provide an environment or platform on which software may execute (an "execution environment"). Due to their emulation of hardware, these virtual machine instances are sometimes referred to as "system virtual machines." Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used as well.

As shown in FIG. 1, each worker 181 may host a number of instances 183. Each instance 183 may be isolated from other instances 183, thus ensuring the security of code executions on the serverless code execution system 110. For example, each instance 183 may be divided by a virtualization boundary, by virtue of the instance 183 being a virtual machine hosted by the worker 181. In addition, each instance 183 may exist within a partitioned user space on the worker 181, which logically partitions resources of the worker 181 among instances 183. Each user space may, for example, represent a "chroot" jail—a known isolation technique for LINUX™ operating systems.

To facilitate rapid execution of code, each worker 181 may be configured to maintain a set of instances 183 in a "pre-warmed" state, being at least partially configured to begin execution of code. For example, instances may be created on the worker and configured with access to computing resources (CPU, RAM, drive storage, etc.). In some cases, it may be impractical or impossible to maintain instances 183 in a fully warmed state for all possible code executions, as executions may be associated with a wide variety of at least partially distinct data sets (e.g., disk images and/or snapshots). Thus, instances 183 may be maintained in a "greatest commonality" for a given group of tasks, such as being provisioned with a set of computing resources common to those tasks, being configured to accept an operating system type used by those tasks, etc.

On receiving instructions to provision an instance 183 to support execution of the task, the worker 181 may adjust the configuration of the instance 183 to support that execution. Specifically, the worker 181 may provision the instance 183 with access to a disk image or snapshot corresponding to the task. In some instances, the worker 181 may retrieve the disk image for the task and store the full image locally. In other instances, the worker 181 may provide to an instance 183 what appears to be full local access to the disk image or snapshot, while "lazily" retrieving portions of that image or snapshot in response to a request to read such portions. Techniques for providing lazy retrieval of image portions are discussed in the U.S. patent application Ser. No. 17/105,250, filed Nov. 25, 2020 and entitled "LOW LATENCY ACCESS TO DATA SETS USING SHARED DATA SET PORTIONS" (the "'250 Application") the entirety of which is hereby incorporated by reference.

In addition, the system 110 includes a number of components for facilitating distribution of calls to execute a function from frontends 120 to particular VM instances 183. For example, the serverless code execution system 110 includes one or more worker managers 140 configured to manage execution environments (e.g., virtual machine instances) hosted by workers 181 among a worker fleet 180. The worker managers 140—each of which are illustratively implemented as physical or virtual-on-physical devices—illustratively "lease" particular VM instances 183 within the fleet 180, thus gaining operational control to, for example, instruct virtual machine instances 183 to execute code of the function. Thus, on receiving a call to execute a function, a frontend 120 may distribute the call to a worker manager 140, which may identify a currently-leased VM instance 183 in which to implement the function, and cause the instance 183 to implement the function.

In the instance that a worker manager 140 does not currently lease a VM instance 183 corresponding to the called function, the worker manager 140 can contact a placement service 160 to request a lease on an additional instance 183, which is illustratively configured to grant to the worker managers 140 leases to individual VM instances 183. Illustratively, the placement service 160 may maintain state information for VM instances 183 across the fleet 180, as well as information indicating which manager 140 has leased a given instance 183. When a worker manager 140 requests a lease on an additional instance 183, the placement service 160 can identify an appropriate instance 183 (e.g., warmed with software and/or data required to support a call to implement a function) and grant to the manager 140 a lease to that instance 183. In the case that such an instance 183 does not exist, the placement service 160 can instruct a worker 181 to create such an instance 183 (e.g., by creating an instance 183 or identifying an existing unused instance 183, providing the instance 183 with access to a required set of data to support execution, etc.) thereafter grant to the worker manager 140 a lease to that instance 183, thus facilitating execution.

To facilitate interaction with external data sources, such as the stream data system 170 or auxiliary services 106, the system 110 including a polling fleet 130, which operates to poll external data sources for data. Illustratively, the polling fleet 130 may include one or more computing devices (shown in FIG. 1 as poller devices 132A-N) configured to periodically transmit a request to the stream data system 170 to retrieve any newly available data (e.g., social network "posts," news articles, files, records, etc.), and to determine whether that data corresponds to a user-established criteria triggering execution a function on the serverless code execution system 110. Illustratively, criteria for execution of a function may include, but is not limited to, whether new data is available at the auxiliary services 106 or the stream data system 170, the type or content of the data, or timing information corresponding to the data. In some instances, the auxiliary services 106 or stream data system 170 may function to notify the frontend 120 of the availability of new data, and thus the polling fleet 130 may be unnecessary with respect to such services.

In accordance with embodiments of the present disclosure, the poller fleet 130 can be configured to include a dynamic number of poller devices 132A-N (e.g., implemented as virtual machine instances on an underlying computing system), based on the number of message shards 174 within a message stream 172. For example, as shown by the dotted lines of FIG. 1, message shard 174A may correspond to poller device 132A, message shard 174B may correspond to poller device 132B, etc. Thus, as the number of message shards 174 changes (e.g., due to volume of the message stream), the number of poller devices 132 may also change. As such, the poller fleet 130 may be in communication with stream data system 170, and the system 170 may notify the poller fleet 130 of changes to the message shards 174. In such a configuration, each poller device 132A can be configured to poll a message shard 174 to retrieve messages in the sub-stream corresponding to the message shard. The messages may be retrieved individually or in batches (e.g., batches of 10 messages, 50 messages, 100 messages, 500 messages, etc.). Thereafter, the poller device 132 may invoke calls to aggregation functions 162 or destination functions 164 as appropriate for the messages. In some instances, the call from each poller device 132 to corresponding function executions may be made synchronously, such that the poller device 132 waits for confirmation that the execution was successful prior to making a next call.

While some functionalities are generally described herein with reference to an individual component of the serverless code execution system 110 or the stream data system 170, other components or a combination of components may additionally or alternatively implement such functionalities. For example, while a poller device 132A may operate to poll a message shard 174 for messages, the message shards 174 may additionally or alternatively be configured to notify the serverless code execution system 110 (e.g., the frontend) of new messages on the shard 174.

Figure 3:
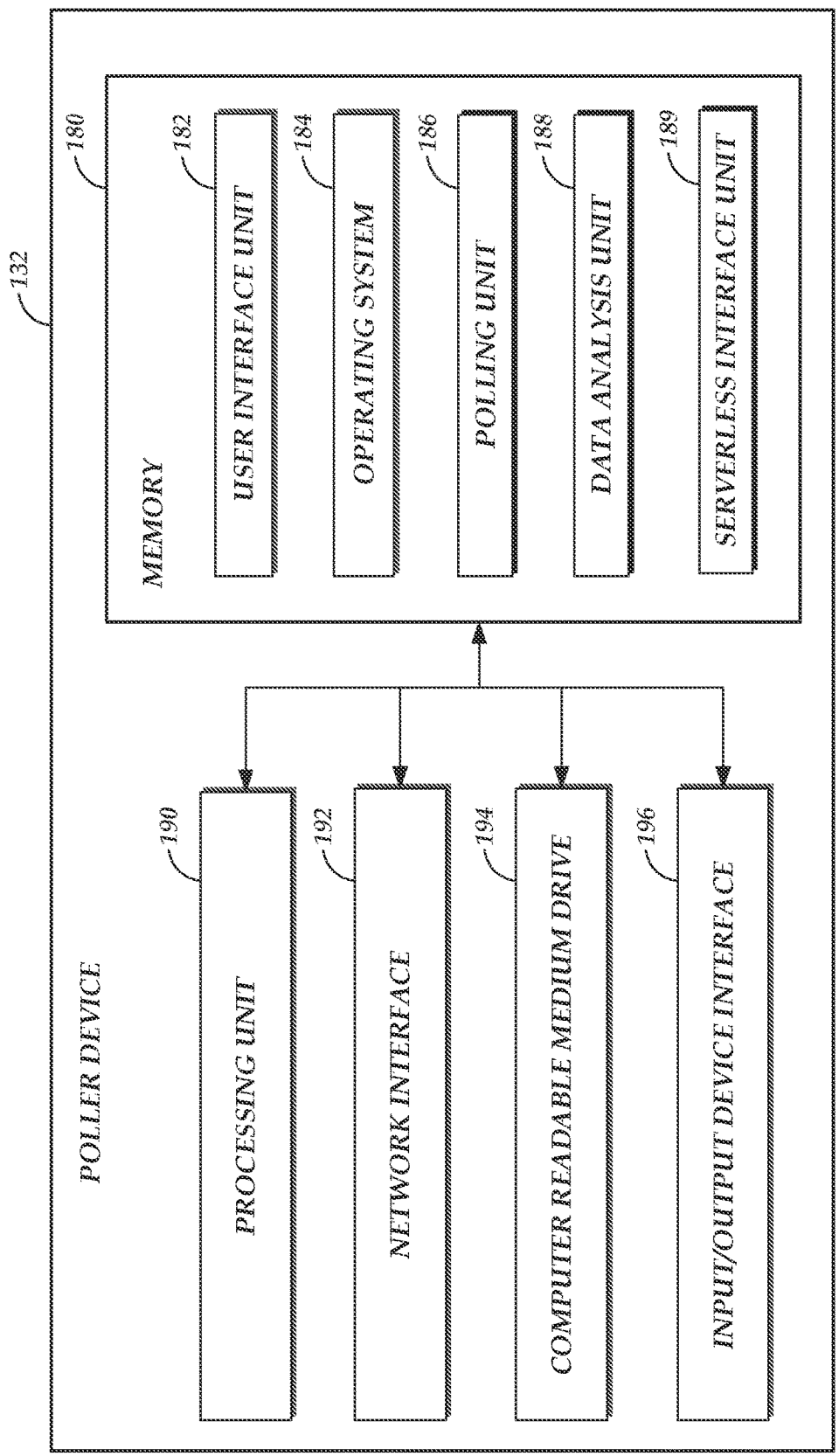
FIG. 3 depicts a general architecture of a computing device providing a polling device of FIG. 2 configured to invoke serverless functions to conduct streaming analytics against a data stream.

FIG. 3 depicts a general architecture of a poller device 132. The general architecture of the poller device 132 depicted in FIG. 3 includes an arrangement of computer hardware and software modules that may be used to implement aspects of the present disclosure. The hardware modules may be implemented with physical electronic devices, as discussed in greater detail below. The poller device 132 may include many more (or fewer) elements than those shown in FIG. 3. It is not necessary, however, that all of these generally conventional elements be shown in order to provide an enabling disclosure. Additionally, the general architecture illustrated in FIG. 3 may be used to implement one or more of the other components illustrated in FIG. 1. As illustrated, the poller device 132 includes a processing unit 190, a network interface 192, a computer readable medium drive 194, and an input/output device interface 196, all of which may communicate with one another by way of a communication bus. The network interface 192 may provide connectivity to one or more networks or computing systems. The processing unit 190 may thus receive information and instructions from other computing systems or services via the network 104. The processing unit 190 may also communicate to and from memory 180 and further provide output information for an optional display (not shown) via the input/output device interface 196. The input/output device interface 196 may also accept input from an optional input device (not shown).

The memory 180 may contain computer program instructions (grouped as modules in some embodiments) that the processing unit 190 executes in order to implement one or more aspects of the present disclosure. The memory 180 generally includes random access memory (RAM), read only memory (ROM) and/or other persistent, auxiliary or non-transitory computer readable media. The memory 180 may store an operating system 184 that provides computer program instructions for use by the processing unit 190 in the general administration and operation of the worker manager 140. The memory 180 may further include computer program instructions and other information for implementing aspects of the present disclosure. For example, in one embodiment, the memory 180 includes a user interface unit 182 that generates user interfaces (and/or instructions therefor) for display upon a computing device, e.g., via a navigation and/or browsing interface such as a browser or application installed on the computing device. In addition, the memory 180 may include and/or communicate with one or more data repositories (not shown), for example, to access user program codes and/or libraries.

In addition to and/or in combination with the user interface unit 182, the memory 180 may include a polling unit 186, data analysis unit 188, and serverless interface unit 189. In one embodiment, the polling unit 186, data analysis unit 188, and serverless interface unit 189 individually or collectively implement various aspects of the present disclosure. For example, the polling unit 186 can represent code executable to poll a message stream 172 to identify and obtain data items from the stream 172. The data analysis unit 188 can represent code executable to analyze those data items to determine whether criteria are satisfied for invoking an aggregation or destination function associated with the stream. The serverless interface unit 189 can represent code executable to invoke such aggregation or destination functions, and to maintain state information between such invocations.

While the polling unit 186, data analysis unit 188, and serverless interface unit 189 are shown in FIG. 3 as part of the poller device 132, in other embodiments, all or a portion of the polling unit 186, data analysis unit 188, and serverless interface unit 189 may be implemented by other components of the serverless code execution system 110 and/or another computing device. For example, in certain embodiments of the present disclosure, another computing device in communication with the serverless code execution system 110 may include several modules or components that operate similarly to the modules and components illustrated as part of the poller device 132.

Figure 4:
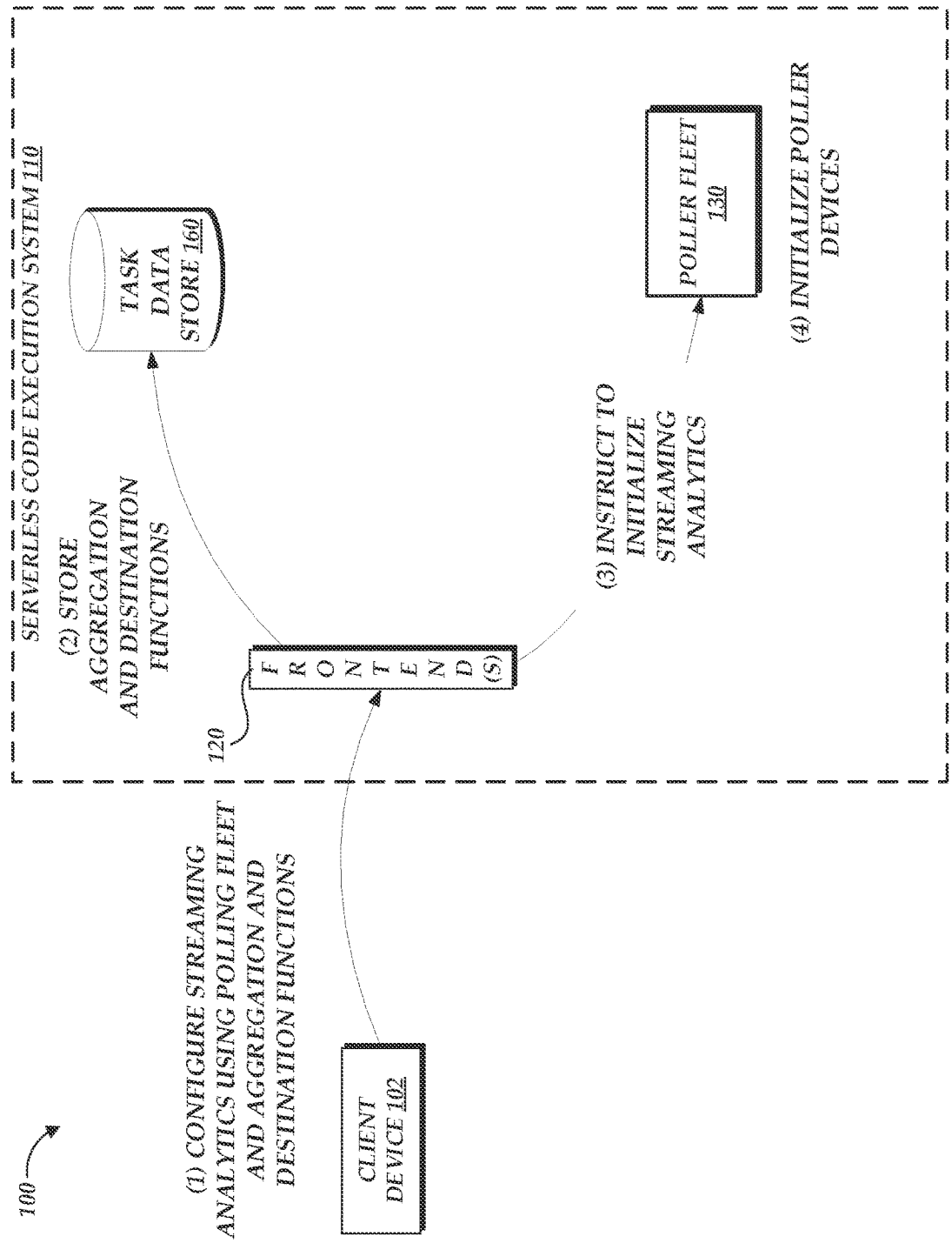
FIG. 4 is a flow diagram depicting illustrative interactions for initiating streaming analytics against a data stream, including specification of serverless functions to be invoked to conduct such streaming analytics.

With reference to FIG. 4, illustrative interactions are depicted for initiating streaming analysis on data items in a message stream 172 using the serverless code execution system 110 of FIG. 2. Specifically, the interactions of FIG. 4 are illustrative of those that may be undertaken by the system 110 to receive and respond to a user request to conduct streaming analytics according to aggregation and destination functions provided by the user.

The interactions of FIG. 4 begin at (1), where a client device 102 configures the serverless code execution system 110 to implement streaming analytics by configuring aggregation and destination functions on the system 110. In the illustrative interactions of FIG. 3, the aggregation and destination functions are designated as serverless functions within the serverless code execution system 110, which may have been previously created by the user device 102 or which may be created by the serverless code execution system 110 as part of configuring streaming analytics (e.g., the user may submit code for the aggregation and destination functions as part of configuring those functions to implement streaming analytics). In other embodiments, a user may designate other aggregation and destination functions, such as functions made available by the serverless code execution system 110 or other users. In addition to designation of aggregation and destination functions, the illustrative configuration of FIG. 4 generally includes specification of a data stream (e.g., the message stream 172 of FIG. 1)

including data items (or "messages") to be processed via the aggregation and destination functions, as well as criteria for invoking the aggregation and destination functions. Such criteria can include windowing criteria specifying windows over which messages should be analyzed (e.g., sliding and/or fixed windows), including for example window durations or criteria for establishing such durations. The destination function may illustratively be executed at the end of each such window, using state information associated with processing the data items occurring within the window. The criteria for invoking the aggregation and destination functions can further include aggregation criteria, specifying when the aggregation function should be run to process data items within the window. For example, the aggregation criteria may include a maximum number or data size of items to be processed by an individual invocation of the aggregation function. As discussed below, the criteria for invoking the aggregation and destination functions can thereafter be applied by poller devices 132 within the poller fleet 132 to conduct streaming analytics against a message stream 172 by invocation of the aggregation and destination functions.

Accordingly, the frontend 120, at (2), transmits the provided aggregation and destination functions (if required) to the task data store 160, for later retrieval and execution. Additionally, at (3), the frontend 120 instructs the poller fleet to initialize streaming analytics as specified by the client device 102. The frontend 120 may illustratively pass to the poller fleet identification of a message stream 172 containing data to be analyzed, identification of the aggregation and destination functions, and the criteria for invoking the aggregation and destination functions. The poller fleet 130 then, at (4), initializes poller devices 132 in order to conduct streaming analytics. Illustratively, the poller fleet 130 may initialize one or more poller devices for each shard 174 of the message stream 172.

Figure 5:
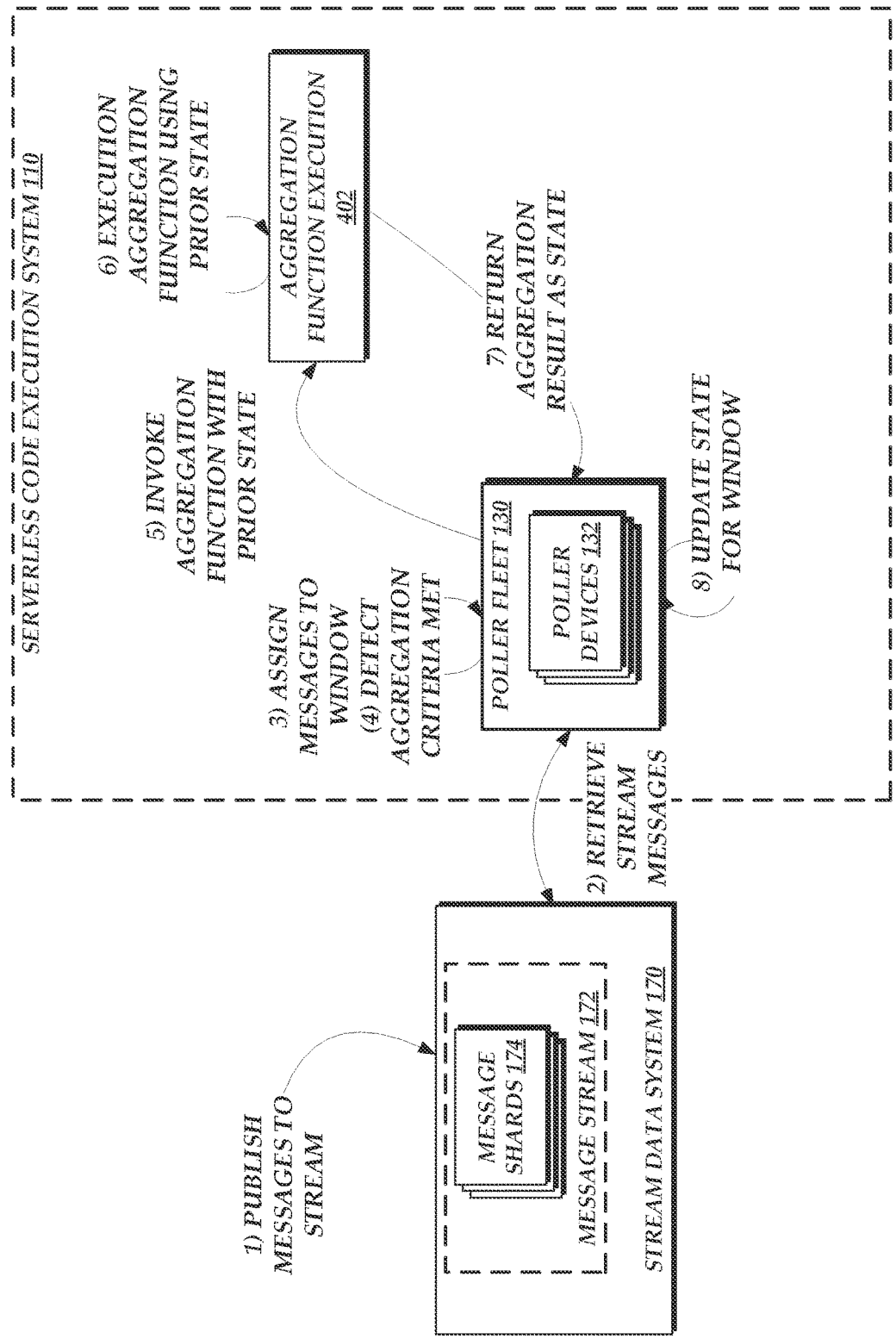
FIG. 5 is a flow diagram depicting illustrative interactions for initiating an aggregation function on a serverless compute system to conduct analysis regarding data items within a data stream.

With reference to FIG. 5, illustrative interactions are shown for conducting streaming analytics of messages within a message stream 172 by invocation of an aggregation function on the serverless code executions system 110. For example, the interactions of FIG. 5 may occur in response the interactions of FIG. 4, described above.

The interactions of FIG. 5 begin at (1), where one or more messages are published to a messages stream 172 on the stream data system 170. The messages may be published by and number of data sources, such as client devices 102, auxiliary services 106, or other network devices. For example, the messages may be published during operation of a computing system, in order to log to the stream 172 data regarding operation of the computing system. The messages may contain any of a wide variety of types of data, corresponding to data analyzed via execution of aggregation and destination functions.

At (2), the poller fleet 130 (e.g., using poller devices 132) retrieves messages from the stream 172. In one embodiment, retrieval utilizes a "pull" mechanism, whereby the fleet 130 periodically (e.g., every second, 10 seconds, 30 seconds, etc.) pulls new messages from the stream 172. In another embodiment, retrieval uses a "push" mechanism, whereby the stream 172 notifies the fleet 130 of new messages.

At (3), the poller fleet 130 assigns the retrieved messages to one or more windows, according to windowing criteria. For example, a timestamp associated with each message can be used to assign the message to respective windows. In the case of fixed, non-overlapping windows, each message may be assigned to a single window. In the case of sliding or otherwise overlapping windows, each message may be assigned to multiple windows. For example, each message may provoke creation of a new sliding window of a given duration.

Thereafter, at (4), the poller fleet 130 determines that the retrieved messages for a given window satisfy criteria for invocation of the aggregation function with respect to those messages. Such criteria may include, for example, a number of messages or a total data size of messages. Such criteria may further include a closing of the window including the messages, which may be determined for example based on the presence of messages within the stream with a timestamp subsequent to a closing time for the window.

Accordingly, at (5), the poller fleet 130 invokes the aggregation function to process the messages. In one embodiment, the invocation passes the messages to the aggregation function execution 402. In another embodiment, the invocation identifies the messages on the message stream 172, such that the execution 402 can obtain the messages during execution. In the invocation, the poller fleet 130 additionally passes to the aggregation function state information for the window to which the messages have been assigned. Illustratively, the poller fleet 130, during a first invocation of the aggregation function with respect to a given window, may pass initial state information, which may be null. During subsequent invocations, the aggregation function may be passed updated state information for the window, as described below. The invocation may illustratively be a synchronous execution, such that operation of the fleet 130 or a particular poller device 132 pauses and awaits completion of the execution before proceeding with additional operations.

At (6), the serverless code execution system 110 initiates an aggregation function execution 402. The execution 402 illustratively represents execution of code that analyzes the messages corresponding to the invocation using the passed in state information, if any. For example, the execution 402 may determine a count, average, minimum, or maximum of one or more field values in each message for a given window. One skilled in the art will appreciate that these functionalities are provided for illustration only, and that the aggregation function, in being user-defined, may implement any number of functionalities.

At (7), as a result of processing messages corresponding to the invocation, the aggregation function execution 402 returns to the poller fleet 130 a result as state information for a corresponding window. For example, the execution 402 may pass a count, average, minimum, or maximum value identified during processing of messages for the window to the poller fleet 130. At (8), the fleet updates the state information for the corresponding window with the returned result. Thus, future invocations of the aggregation function can be invoked using this state information, enabling such executions to be stateful and without requiring such state to be maintained within an execution environment of the aggregation function execution 402.

While a single sequence of interactions is shown in FIG. 5, one skilled in the art will appreciate that these interactions may occur multiple times, with some interactions potentially occurring concurrently. For example, messages may be published to the stream independently of operation of the system 110. Similarly, messages may be retrieved from the stream independently of remaining interactions of FIG. 5, and, e.g., cached at the poller fleet 130 for analysis according to streaming analytics criteria. Moreover, interactions (3)-(8) may occur repeatedly with respect to messages in a given window, such that multiple aggregation function executions 402 occur within that window. Similarly, these interactions may be repeated for each window of messages. While the interactions of FIG. 5 are described with reference to the poller fleet 130 generally, these interactions may be duplicated among poller devices 132. For example, each device 132 may be configured to undertake interactions (3)-(8) with respect to a different shard 174 of the stream 172. In some embodiments, multiple devices 132 may be configured to undertake interactions (3)-(8) with respect to a single shard 174. For example, windowing criteria may include partitioning criteria, such as an attribute of messages within a shard 174 to use as a partition key in order to divide the messages (e.g., according to a consistent hash algorithm), with windowing and aggregation criteria. Each poller device 132 of the multiple devices 132 may thereafter apply windowing and aggregation criteria to their respective portion of the messages to implement the interactions noted above.

Figure 6:
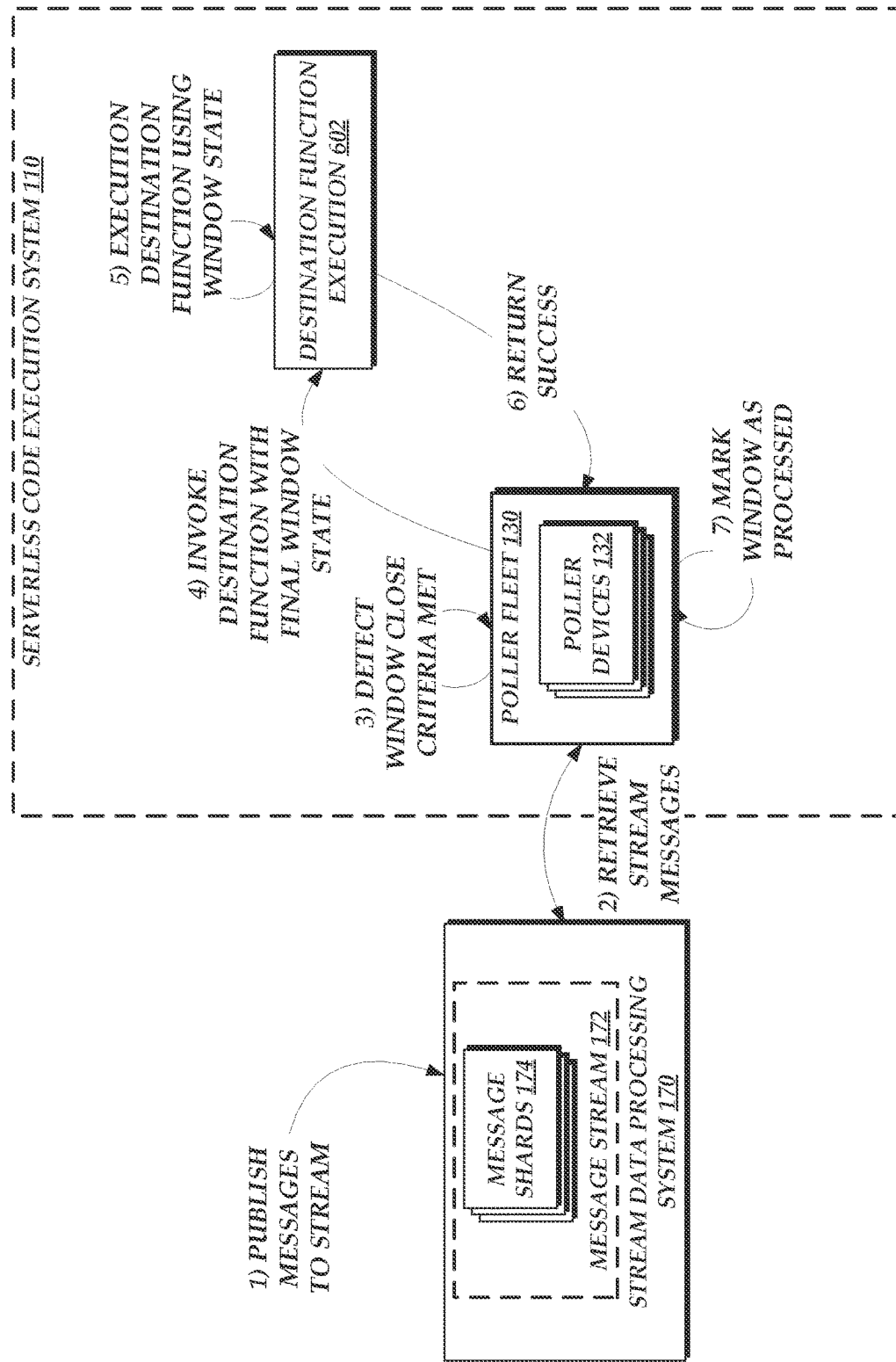
FIG. 6 is a flow diagram depicting illustrative interactions for initiating a destination function on a serverless compute system to use state information obtained from invocations of an aggregation function to provide a result of streaming analysis conducted regarding data items within a data stream.

With reference to FIG. 6, illustrative interactions are shown for conducting streaming analytics of messages within a message stream 172 by invocation of a destination function on the serverless code executions system 110. The interactions may illustratively occur subsequently or concurrently with interactions of FIG. 5. For example, as shown in FIG. 6, the interactions begin at (1), where messages are published to a stream 172, and continue at (2), where the poller fleet 130 retrieves one or more messages from the stream. These interactions are substantially similar to interactions (1) and (2) of FIG. 5, and thus will not be re-described in detail. In some cases, interactions (1) and (2) of FIGS. 5 and 6, respectively, may represent the same interactions. That is, a given set of messages published to the stream 172 and retrieved by the poller fleet 130 may result in the interactions of both FIGS. 5 and 6.

After retrieving messages, at (3), the poller fleet 130 detects a window close. As discussed above, each window can be associated with given start and end periods. As such, detecting a window close can correspond to detecting that the window's end period has occurred. In one embodiment, detecting a window close corresponds to detecting that a message in the stream has a time stamp after the window's end period. This may indicate, for example, that all messages within the window have been published to the stream 172, and are therefore available to the poller fleet 130. In instances where the stream 172 does not guarantee ordering (e.g., where a message with an earlier timestamp is not guaranteed to exist in the stream prior to a message with a later timestamp), the poller fleet 130 may consider unordered messages as part of a later window. For example, any message with a timestamp corresponding to a closed window may be considered by the fleet 130 as part of an earliest open window. In other embodiments, the poller fleet 130 may be configured to attempt to place out-of-order messages into a correct window. For example, the poller fleet 130 may be configured to consider an out-of-order message as included within its appropriate window (according to the timestamp on the message), so long as a destination function for that window has not been invoked. The poller fleet 130 may in some cases be configured to delay invocation of a destination function for each window to account for out of order messages. For example, on detecting a window close, the poller fleet 130 may delay invocation of the destination function for a given period (e.g., 1 second, 10 seconds, 30 seconds, etc.), such that out of order messages obtained during that period can be processed as part of the closed window.

Thereafter, at (4), the poller fleet 130 invokes the destination function with the final state for the window, corresponding to state returned by an execution of the aggregation function after processing the messages corresponding to the window. In one embodiment, the poller fleet 130 is configured to confirm that all messages within a window have been processed by execution of the aggregation function prior to invoking the destination function. If messages exist that have not been processed, the poller fleet 130 may invoke the aggregation function (e.g., in the manner described with respect to FIG. 6) on window close in order to obtain final state for the window. The poller fleet 130 can then invoke the destination function and pass that function the final window state. In response to the invocation, the serverless code execution system 110 initiates a destination function execution 602, which at (5) executes to process the final window state. For example, the destination function execution 602 may evaluate the state to determine an action to be taken (if any), and undertake the relevant action. Relevant actions may include, for example, logging the final state, sending an alert if the final state matches given criteria, etc. Because the evaluation and relevant action are defined within the user-defined destination function, these may encompass a wide variety of functionalities.

At (6), the destination function execution 602 returns to the poller fleet an indication of success. The poller fleet 130 then, at (7), marks the window as processed. Accordingly, because the aggregation and destination functions have been invoked for each message within the window, the requested streaming analytics have been applied to the window. In accordance with the interactions above, the streaming analytics have been conducted without requiring deployment of specific resources to conduct such analytics, enabling end users to enjoy the benefits associated with serverless computing during such analytics. Moreover, such analytics are enabled to operate statelessly, without requiring such state to be maintained in execution environments of the serverless code execution system 110, and thus without inhibiting flexibility of that system 110 in executing user-defined code.

Various modifications may be made to the interactions of FIGS. 5 and 6. For example, while FIGS. 5 and 6 discuss separate aggregation and destination functions, as noted above these functions may in some instances represent a single function. The invocations of FIGS. 5 and 6 may therefore refer to invocation of the same function with, e.g., a flag or other input designating which functionality (aggregation or destination) is to be invoked. In some cases, a single invocation may be used to invoke both aggregation and destination functionality. For example, on detecting a window has closed, the poller fleet may invoke a single function to both process remaining (unprocessed) messages for the window, and use a result of such processing as a final state to implement destination processing. Accordingly, interaction (5) of FIG. 5 and (4) of FIG. 6 may be combined into a single invocation, and interactions (7) and (8) of FIG. 5 may be omitted.

While not shown in FIGS. 5 and 6, the poller fleet 130 may in some embodiments undertake additional interactions to ensure resiliency of operation. For example, each device 132 may periodically "checkpoint" its state to an external storage system, such as auxiliary services 106. Checkpointing may indicate, for example, messages of a stream 172 processed by the aggregation function and state associated with that processing, whether a destination function has been successfully invoked for a window, and the like. In this manner, should a poller device 132, fail, a new poller device 132 may be initialized and enabled to resume operation of the failed poller device 132 using checkpoint information of that failed poller device 132.

Still further, while the interactions of FIGS. 5 and 6 generally contemplate processing for a single continuous set of messages (e.g., within a given stream 172 or shard 174) in some instances streams and/or shards may be split or merged. For example, the stream data system 170 may be configured to split or merge streams on request by users owning such streams, or to split or merge shards according to a volume of message on those shards. The poller fleet 130 may in some embodiments be configured to handle such splits or merges. For example, the poller fleet 130 in detecting a split or a stream or shard may apply the streaming analytics criteria for the unsplit stream or shard to both resulting streams or shards. A user configuring streaming analytics may specify which of two sets of criteria (if different) should be applied to merged streams or shards, such that the poller fleet 130 applies the specified criteria to a merged stream or shard. In one embodiment, the poller fleet 130 treats splits or merges as a window boundary, such that no state information is maintained across splits or merges. In another embodiment, the poller fleet 130 can maintain windows across split/merge boundaries, and handle state information accordingly. For example, in the case of a split, the fleet 130 may duplicate state information of the unsplit shard or stream to both resultant shards or streams. In such an example, an aggregation and/or destination function may include code executable to determine relevant state information for the corresponding shard or stream. In the case of a merger, the fleet 130 may combine or concatenate state information for the merged streams or shards. Various additional modifications to the interactions of FIGS. 5 and 6 may be made.

Figure 7:
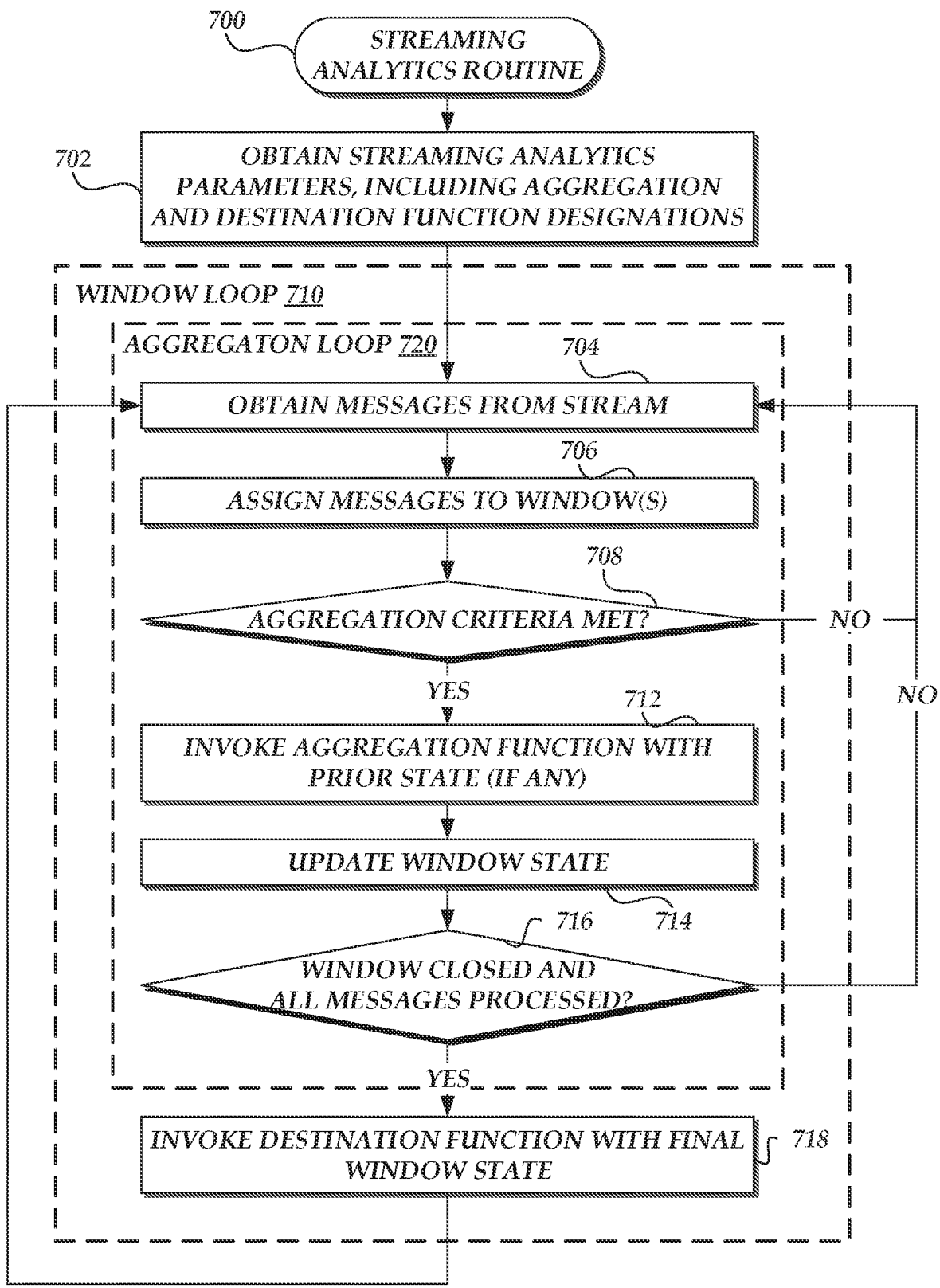
FIG. 7 is an illustrative routine for conducting streaming analytics against a data stream by invocation of serverless functions on a serverless compute system.

With reference to FIG. 7, an illustrative routine 700 will be described for conducting streaming analytics using a serverless code execution system. The routine 700 may be implemented, for example, on a poller device 132 of a poller fleet 130.

The routine 700 begins at block 702, where the poller device 132 obtains streaming analytics parameters, including designations of aggregation and destination functions to be used to conduct streaming analytics. The streaming analytics parameters further illustratively include windowing criteria specifying criteria for identifying windows over which to conduct analytics and to invoke the destination function, and aggregation criteria specifying when to invoke an aggregation function to produce state information for the window to be passed to either to a subsequent aggregation function or to the destination function.

Thereafter, the poller device 132 enters the window loop 710 and the aggregation loop 720, as shown in FIG. 7. The window loop 710 illustratively denotes operations taken with respect to a given window in a data stream, such that, e.g., each interaction of the loop occurs with respect to a different window of messages on the stream. Aggregation loop 720 denotes operations taken with respect to subsets of messages within a window, to conduct intermediate processing of those messages and facilitate generation of state information to be used during a subsequent instance of the loop 720, if any, or to be passed to a destination function at the end of the window loop 710.

Within the loops 710 and 720, the poller device 132 obtains messages from the stream. Illustratively, the poller device 132 may obtain messages by reading the messages from the stream. Alternatively, the poller device 132 may include a separate process to read messages from the stream and place them in a local cache of the device 132, from which they may be read during implementation of the routine 700.

At block 706, the poller device 132 assigns each message to a window. Illustratively, the device 132 may inspect an attribute of each message, such as a timestamp, to identify one or more windows corresponding to the message. In the instance of non-overlapping windows, the device may calculate a single window for each message based on window boundaries calculated from a fixed point in time. For example, a starting time (t=0) may be a first boundary, with additional boundaries created at fixed intervals correspond to a duration of each window. In the instance of sliding windows, the poller device 132 may assign each message to a new window with a start time corresponding to the attribute of the message, as well as to any prior windows that include the timestamp of the message and that have not yet closed.

At block 708, the poller device 132 determines whether the messages satisfy aggregation criteria for any open windows. For example, the poller device 132 can determine, for each open window, whether the set of unprocessed messages for the window collectively satisfy aggregation criteria for the window. Aggregation criteria may be satisfied, for example, based on a total number of unprocessed messages, a total size of unprocessed messages, or detecting that the window should be closed (e.g., based on detecting a message with a timestamp attribute subsequent to a close time of the window). If aggregation criteria are not satisfied, the routine 700 returns to block 704, where additional messages are obtained and the routine 700 proceeds as noted above.

When aggregation criteria are satisfied, the routine 700 proceeds to block 712, where the aggregation function is invoked for those unprocessed messages of the stream that satisfied the aggregation criteria. When invoking the aggregation function, the poller device 132 can pass to the aggregation function prior state information for the window, if any. Prior state information may include, for example, an initial state value (e.g., null) or state information returned as a result of a prior invocation of the aggregation function. As discussed above, the aggregation function may then be executed on the serverless compute system 110 using the prior state information, and execution of the aggregation function illustratively returns a result to the poller device 132. The poller device 132, in turn, updates the state for the window corresponding to the invocation at block 714.

The routine 700 then proceeds to block 716, where the poller device 132 determines whether closing criteria is met for any open windows, and whether all messages for that window have been processed by the aggregation function. As noted above, each window may be associate with a timespan on the stream, and closing criteria can thus indicate that the window is to be closed after that timespan has elapsed. For example, the poller device 132 may determine that a window should be closed after a message is detected with a timestamp subsequent to the windows' timespan, a threshold period after such a message is detected, etc. If the closing criteria is not met, or messages remain unprocessed within the window, the routine 700 returns to block 704 and proceeds as noted above. If a window is to be closed and all messages have been processed, the routine 700 exits the aggregation loop 720 with respect to that window and proceeds to block 718, where the poller device 132 invokes the destination function using the final state for the window (e.g., generated based on a invocations of the aggregation function with respect to messages in the window). As noted above, the destination function illustratively processes the final state for the window in order to determine an action, if any, to take with respect to that state, such as reporting the state to an end user, to a logging endpoint, etc. The routine 700 then exists the window loop 710 and returns to block 704, where additional messages of other windows are obtained and processed in the manner above. The routine 700 can then proceed to process the additional messages, thus providing streaming analytics for messages within the data stream.

While FIG. 7 depicts one example routine 700, various additions or modifications to the routine 700 may be made. For example, as noted above, a poller device 132 may in some instance implement checkpointing or other functionality to provide resiliency of operation, such as by logging state of the poller device 132 at various times. As another example, while invocation of aggregation and destination functions is discussed separately, in some instances these invocations may be combined. For example, the routine 700 may be modified to combine blocks 712 and 718 in cases where the aggregation function is being invoked due to window closure. A receiving function (e.g., representing a combination of an aggregation and destination function) may then process any unprocessed messages to generate final state, and implement destination functionality based on that final state. This may obviate need for block 714 with respect to final invocations of the aggregation function in cases where that function is invoked due to window closure. Various additional modifications may be made.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for implementing streaming analytics using serverless code executions, the system comprising:
   a streaming data system comprising a set of computing devices configured to host a data stream comprising messages, individual messages within the data stream being associated with timestamps corresponding to relative positions within the data stream;
   a serverless computing system configured to obtain invocations of serverless functions and in response initiate execution of the serverless functions, wherein the serverless functions comprise:
      an aggregation function representing code executable to process one or more input messages from the data stream and generate state information representing analysis of the one or more input messages; and
      a destination function representing code executable to process state information from the aggregation function; and
   a poller device configured to:
      iteratively retrieve messages from the data stream;
      using window criteria, assign each retrieved message to a window from a plurality of windows; and
      for each window of the plurality of windows:
         group messages assigned to the window according to aggregation criteria to result in at least a first group of messages and a second group of messages;
         invoke a first execution of the aggregation function to process the first group of messages;
         obtain first state information from the first execution;
         invoke a second execution of the aggregation function to process the second group of messages at least partly by passing the first state information to the second execution, wherein the second execution of the aggregation function results in second state information; and
         invoke an execution of the destination function at least partly by passing to the execution of the destination function the second state information, wherein execution of the destination function provides processing of a result of conducting the streaming analytics against the messages assigned to the window.

2. The system of claim 1, wherein the aggregation function represents code executable to provide at least one of a count, an average value, a maximum value, or a minimum value of a field within the one or more input messages.

3. The system of claim 1, wherein the windowing criteria specify non-overlapping windows of a fixed length.

4. The system of claim 1, wherein the windowing criteria specify sliding windows, and wherein the poller device is further configured to add a new window to the plurality of windows for each message retrieved from the data stream.

5. The system of claim 1, wherein the data stream is divided into a plurality of shards, and wherein the poller device is included within a plurality of poller devices comprising at least one poller device assigned to each shard of the plurality of shards, and wherein iteratively retrieving messages from the data stream comprises iteratively retrieving messages from the shard to which the poller device is assigned.

6. A computer-implemented method comprising:
iteratively retrieving messages from a data stream;
using window criteria, assigning each retrieved message to a window from a plurality of windows; and
for each window of the plurality of windows:
grouping messages assigned to the window according to aggregation criteria to result in at least a first group of messages and a second group of messages;
invoking a first execution of an aggregation function on a serverless computing system, wherein the aggregation function represents code executable to process an input group of messages and provide state information as a result, wherein the first group of messages represents the input group for the first execution, and wherein the result of the first execution is first state information;
obtaining the first state information from the first execution;
invoking a second execution of the aggregation function on the serverless computing system, wherein the second group of messages represents the input group for the second execution, wherein invoking the second execution comprises passing the first state information to the second execution, and wherein the result of the second execution is second state information; and
invoking an execution of a destination function on the serverless compute system, wherein the destination function represents code executable to process input state information from the aggregation function and provide a result, and wherein the second state information represents the input state information for the execution of the destination function.

7. The computer-implemented method of claim 6, wherein the aggregation function and destination function represent a single function on the serverless compute system, wherein invoking the aggregation function comprises invoking the single function with an input requesting functionality of the aggregation function, and wherein invoking the destination function comprises invoking the single function with an input requesting functionality of the destination function.

8. The computer-implemented method of claim 6, wherein invoking the aggregation function comprises passing existing state information for a window associated with invocation of the aggregation function, and wherein the method further comprises generating initial state information for each window of the plurality of windows.

9. The computer-implemented method of claim 6, wherein passing the first state information to the second execution comprises passing the first state information as a parameter during invocation of the second execution.

10. The computer-implemented method of claim 6 further comprising, prior to invoking the execution of the destination function, determining that the second state information represents final state information for a current window at least partly by determining that no additional messages assigned to the window are awaiting processing by the aggregation function and determining that a timespan of the current window has elapsed.

11. The computer-implemented method of claim 10, wherein determining that the timespan of the current window has elapsed comprises determining that a retrieved message is associated with a timestamp subsequent to the timespan.

12. The computer-implemented method of claim 6, wherein the aggregation criteria specify at least one of a maximum number of messages within each group or a maximum data size of messages within each group.

13. The computer-implemented method of claim 6, wherein the windowing criteria specify sliding windows, and wherein the method further comprises adding a new window to the plurality of windows for each message retrieved from the data stream.

14. Non-transitory computer-readable media comprising instructions that, when executed by a computing system, causes the computing system to:
iteratively retrieve messages from a data stream;
using window criteria, assign each retrieved message to a window from a plurality of windows; and
for each window of the plurality of windows:
group messages assigned to the window according to aggregation criteria to result in at least a first group of messages and a second group of messages;
invoke a first execution of an aggregation function on a serverless computing system, wherein the aggregation function represents code executable to process an input group of messages and provide state information as a result, wherein the first group of messages represents the input group for the first execution, and wherein the result of the first execution is first state information;
invoke a second execution of the aggregation function on the serverless computing system, wherein the second group of messages represents the input group for the second execution, wherein invoking the second execution comprises passing the first state information to the second execution, and wherein the result of the second execution is second state information; and
invoke an execution of a destination function on the serverless compute system, wherein the destination function represents code executable to process input state information from the aggregation function and provide a result, and wherein the second stale information represents the input stale information for the execution of the destination function.

15. The non-transitory computer-readable media of claim 14, wherein the aggregation function and destination function represent a single function on the serverless compute system, wherein the instructions, when executed, cause the computing system to invoke the aggregation function at least partly by invoking the single function with an input requesting functionality of the aggregation function, and wherein the instructions, when executed, cause the computing system to invoke the destination function at least partly by invoking the single function with an input requesting functionality of the destination function.

16. The non-transitory computer-readable media of claim 14, wherein the instructions, when executed, cause the computing system to invoke the aggregation function at least partly by passing existing state information for a current window to the aggregation function, and wherein the instructions, when executed, cause the computing system to generate initial state information for each window of the plurality of windows.

17. The non-transitory computer-readable media of claim 14, wherein to pass the first state information to the second execution, the instructions, when executed, cause the computing system to pass the first state information as a parameter during invocation of the second execution.

18. The non-transitory computer-readable media of claim 14, wherein the instructions, when executed, further cause the computing system to, prior to invocation of the execution of the destination function, determine that the second state information represents final state information for a current window at least partly by determining that no additional messages assigned to the window are awaiting processing by the aggregation function and determining that a timespan of the current window has elapsed.

19. The non-transitory computer-readable media of claim 18, wherein determining that the timespan of the current window has elapsed comprises determining that a retrieved message is associated with a timestamp subsequent to the timespan.

20. The non-transitory computer-readable media of claim 18, wherein the windowing criteria specify sliding windows, and wherein the instructions, when executed, further cause the computing system to add a new window to the plurality of windows for each message retrieved from the data stream.

\* \* \* \* \*

UNITED STATES PATENT AND TRADEMARK OFFICE
CERTIFICATE OF CORRECTION

PATENT NO. : 11,388,210 B1
APPLICATION NO. : 17/305139
DATED : July 12, 2022
INVENTOR(S) : Vinayak Sood et al.

It is certified that error appears in the above-identified patent and that said Letters Patent is hereby corrected as shown below:

On the Title Page

On Page 8, Column 1, item (56) under Other Publications, Line 26, delete "bl ogs" and insert --blogs--.

On Page 8, Column 1, item (56) under Other Publications, Line 27, delete "processi ng-made-si mple-with-serverless- mapred uce >." and insert -- processing-made-simple-with-serverless-mapreduce>.--.

On Page 8, Column 1, item (56) under Other Publications, Line 57, delete "laaS" and insert --IaaS--.

On Page 8, Column 2, item (56) under Other Publications, Line 12, delete "val23," and insert --va123,--.

On Page 9, Column 1, item (56) under Other Publications, Line 11, delete "https://en wikipedia." and insert --https://en.wikipedia.--.

In the Drawings

On Sheet 5 of 7, FIG. 5, Line 4 (Approx.), delete "FUINCTION" and insert --FUNCTION--.

On Sheet 6 of 7, FIG. 6, Line 4 (Approx.), delete "FUINCTION" and insert --FUNCTION--.

On Sheet 7 of 7, Reference Number 720, FIG. 7, Line 1, delete "AGGREGATON" and insert --AGGREGATION--.

In the Specification

In Column 6, Line 21, delete "MINI" and insert --MM--.

In Column 13, Line 25, delete ""S3™")." and insert --"S3™").--.

Signed and Sealed this
Twenty-fourth Day of October, 2023

Katherine Kelly Vidal
*Director of the United States Patent and Trademark Office*

CERTIFICATE OF CORRECTION (continued)
U.S. Pat. No. 11,388,210 B1

In the Claims

In Column 26, Claim 1, Line 53, before "the" insert --of--.

In Column 28, Claim 14, Line 43, delete "stale" and insert --state--.

In Column 28, Claim 14, Line 44, delete "stale" and insert --state--.